US010954021B2

(12) United States Patent
Murayama et al.

(10) Patent No.: US 10,954,021 B2
(45) Date of Patent: Mar. 23, 2021

(54) TAPE AND TAPE CASSETTE

(71) Applicant: BROTHER KOGYO KABUSHIKI KAISHA, Nagoya (JP)

(72) Inventors: Kentaro Murayama, Kasugai (JP); Haruki Matsumoto, Nagoya (JP); Yukiko Takami, Inazawa (JP); Harumitsu Inoue, Toki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 181 days.

(21) Appl. No.: 16/130,209

(22) Filed: Sep. 13, 2018

(65) Prior Publication Data
US 2019/0084713 A1    Mar. 21, 2019

(30) Foreign Application Priority Data

Sep. 21, 2017 (JP) .............................. JP2017-181703

(51) Int. Cl.
*B65C 9/44* (2006.01)
*B65C 9/46* (2006.01)
(Continued)

(52) U.S. Cl.
CPC ............... *B65C 9/44* (2013.01); *B41J 3/4075* (2013.01); *B41J 11/42* (2013.01); *B41J 11/46* (2013.01);
(Continued)

(58) Field of Classification Search
CPC ......... B65C 9/44; B65C 9/46; B65C 11/0289; B41J 3/4075; B41J 11/42; B41J 11/46; B41J 13/32; G06K 15/024; G06K 15/10
See application file for complete search history.

(56) References Cited

U.S. PATENT DOCUMENTS 4,477,103 A * 10/1984 Bertolazzi .............. B42D 15/00
  281/2
4,844,629 A    7/1989 Hoyt
(Continued)

FOREIGN PATENT DOCUMENTS

EP    3326827 A1    5/2018
JP    H01-145149 A    6/1989
(Continued)

OTHER PUBLICATIONS

Extended European Search Report dated Mar. 6, 2019 from related EP 18193240.1.
(Continued)

*Primary Examiner* — David H Banh
(74) *Attorney, Agent, or Firm* — Scully, Scott, Murphy & Presser, P.C.

(57) ABSTRACT

A tape having a strip shape extending in a lengthwise direction and a widthwise direction includes: a subject surface located on the tape and exposed in a thickness direction; a first marker provided on the subject surface and being greater than the subject surface in reflectivity to light with a particular wavelength; and a second marker provided on the subject surface and being less than the subject surface in the reflectivity. At least a portion of the first marker and at least a portion of the second marker are identical to each other in position in the widthwise direction. At least a portion of one of the first marker and the second marker and at least a portion of another of the first marker and the second marker are different from each other in position in the lengthwise direction.

9 Claims, 10 Drawing Sheets

(51) Int. Cl.
  *B65C 11/02* (2006.01)
  *B41J 3/407* (2006.01)
  *G06K 15/10* (2006.01)
  *B41J 13/32* (2006.01)
  *G06K 15/02* (2006.01)
  *B41J 11/46* (2006.01)
  *B41J 11/42* (2006.01)

(52) U.S. Cl.
  CPC ............... *B41J 13/32* (2013.01); *B65C 9/46* (2013.01); *B65C 11/0289* (2013.01); *G06K 15/024* (2013.01); *G06K 15/10* (2013.01)

(56) References Cited

U.S. PATENT DOCUMENTS

| | | | |
|---|---|---|---|
| 4,920,882 A | 5/1990 | Hoyt | |
| 6,042,280 A * | 3/2000 | Yamaguchi | B26D 5/00 400/120.16 |
| 2002/0084320 A1* | 7/2002 | Hoffman | G06Q 20/12 235/379 |
| 2006/0001729 A1 | 1/2006 | Inana | |
| 2007/0145150 A1* | 6/2007 | Barczyk | G06K 19/0776 235/492 |
| 2009/0102878 A1* | 4/2009 | Yamada | B41J 3/4075 347/16 |
| 2011/0024022 A1* | 2/2011 | Ardron | B32B 41/00 156/64 |
| 2011/0147447 A1* | 6/2011 | Bandholz | G06K 7/10722 235/375 |
| 2013/0138391 A1* | 5/2013 | Jackson | B65H 7/00 702/150 |
| 2014/0152753 A1 | 6/2014 | Moriyama et al. | |
| 2014/0240385 A1* | 8/2014 | Walker | B41J 2/16526 347/14 |
| 2014/0307019 A1* | 10/2014 | Muro | B41J 11/663 347/16 |
| 2015/0034715 A1* | 2/2015 | Moriyama | B41J 11/46 235/375 |
| 2015/0091966 A1* | 4/2015 | Nagaoka | B41J 15/04 347/16 |
| 2016/0176212 A1* | 6/2016 | Silbert | B41J 2/32 347/19 |
| 2018/0015749 A1 | 1/2018 | Inoue et al. | |

FOREIGN PATENT DOCUMENTS

| | | |
|---|---|---|
| JP | H05-147327 A | 6/1993 |
| JP | H09-109425 A | 4/1997 |
| JP | H09-240121 A | 9/1997 |
| JP | 2000-141775 A | 5/2000 |
| JP | 2002-361959 A | 12/2002 |
| JP | 2005-22130 A | 1/2005 |
| JP | 2006-016167 A | 1/2006 |
| JP | 2009-098848 A | 5/2009 |
| JP | 2014-108590 A | 6/2014 |
| JP | 2017-24329 A | 2/2017 |

OTHER PUBLICATIONS

Japanese Notice of Reasons for Refusal dated Jan. 5, 2021 received in Japanese Patent Application No. 2017-181703, together with an English-language translation.

* cited by examiner

TAPE AND TAPE CASSETTE

CROSS REFERENCE TO RELATED APPLICATION

The present application claims priority from Japanese Patent Application No. 2017-181703, which was filed on Sep. 21, 2017, the disclosure of which is herein incorporated by reference in its entirety.

BACKGROUND

The following disclosure relates to a tape and a tape cassette for printing of a character.

There is conventionally known a technique of providing a marker on a tape for printing of a character. The marker is an indicator indicating a predetermined position, for example. For example, there is known a roll sheet on which a ticket identification mark having predetermined light reflectivity and a near-end identification mark having light reflectivity different from that of the ticket identification mark are provided. The ticket identification mark is an indicator indicating a position of a corresponding ticket. The near-end identification mark is an indicator indicating a near-end position of the roll sheet. A ticket printer detects the ticket identification mark and the near-end identification mark based on a result of detection using (i) light emitted to and reflected from the roll sheet and (ii) a plurality of threshold values different from each other. That is, since the reflectivity of the ticket identification mark and the reflectivity of the near-end identification mark are different from each other, the ticket printer can discriminate between these marks with one optical sensor.

SUMMARY

The above-described ticket printer discriminates between the ticket identification mark and the near-end identification mark based on a rate of decrease of the reflected light with respect to the roll sheet. In this case, in order to accurately discriminate the marks, the reflectivity of the roll sheet is required to be sufficiently higher than the reflectivity of each mark, in other words, a difference in brightness between the ground color of the roll sheet and the mark to be detected is required to be sufficiently large. Since a color and a material of a substrate for formation of each mark need to be those satisfying the above-described requirement, there is a possibility that substrates usable for formation of the marks are limited, unfortunately.

Accordingly, an aspect of the disclosure relates to a tape and a tape cassette having improved flexibility of a substrate usable for forming markers.

In one aspect of the disclosure, a tape has a strip shape extending in a lengthwise direction and a widthwise direction orthogonal to the lengthwise direction and includes: a subject surface located on the tape and exposed in a thickness direction orthogonal to each of the lengthwise direction and the widthwise direction; a first marker provided on the subject surface and being greater than the subject surface in reflectivity to light with a particular wavelength; and a second marker provided on the subject surface and being less than the subject surface in the reflectivity. At least a portion of the first marker and at least a portion of the second marker are identical to each other in position in the widthwise direction. At least a portion of one of the first marker and the second marker and at least a portion of another of the first marker and the second marker are different from each other in position in the lengthwise direction.

In another aspect of the disclosure, a tape cassette includes: a tape roll that is a roll of a tape having a strip shape extending in a lengthwise direction and a widthwise direction orthogonal to the lengthwise direction, the tape including (i) a subject surface located on the tape and exposed in a thickness direction orthogonal to each of the lengthwise direction and the widthwise direction; (ii) a first marker provided on the subject surface and being greater than the subject surface in reflectivity to light with a particular wavelength; and (iii) a second marker provided on the subject surface and being less than the subject surface in the reflectivity, wherein at least a portion of the first marker and at least a portion of the second marker are identical to each other in position in the widthwise direction, and wherein at least a portion of one of the first marker and the second marker and at least a portion of another of the first marker and the second marker are different from each other in position in the lengthwise direction; and a cassette casing which accommodates the tape roll and in which the tape drawn from the tape roll is conveyed along a particular direction. The first marker nearest to a downstream end portion of the tape roll in the particular direction is provided downstream, in the particular direction, of the second marker nearest to the downstream end portion of the tape roll in the particular direction.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENT

Figure 1:
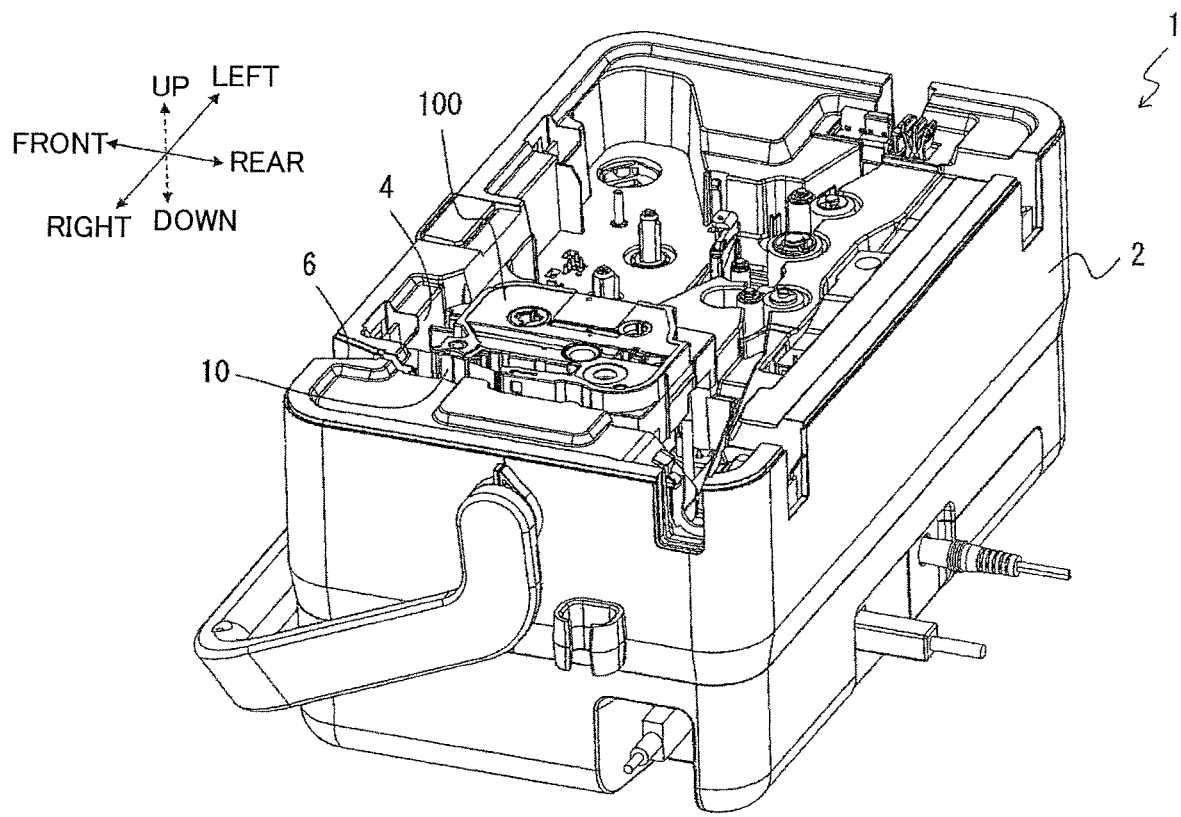
FIG. 1 is a perspective view illustrating an external appearance of a printer 1, with a cover omitted.

Hereinafter, there will be described one embodiment by reference to the drawings. The drawings are for explanation of technical features employable in the present disclosure. It is to be understood that the configuration illustrated in the drawings does not limit the present disclosure and is only one example.

There will be described a printer 1 and a tape cassette 100 according to the present embodiment with reference to FIGS. 1-7. The upper left side, the lower right side, the upper right side, the lower left side, the upper side, and the lower side in FIG. 1 are defined respectively as the front side, the rear side, the left side, the right side, the upper side, and the lower side of the printer 1 and the tape cassette 100. As illustrated in FIGS. 1-5, the printer 1 according to the present embodiment is capable of selectively performing printing on a tape 10 and printing on a tube, not illustrated. The printer 1 at least needs to be capable of performing printing on the tape 10. The following description is given only for a mechanism of the printer 1 which relates to printing on the tape 10. The printer 1 may use various types of the tape cartridge 100 such as a thermal type, a receptor type, and a laminate type. The tape cassette 100 is of the receptor type in the present embodiment.

As illustrated in FIG. 1, the printer 1 includes: a main body 2 shaped like a substantially rectangular parallelepiped box; and a cover, not illustrated, capable of closing an opening formed in an upper portion of the main body 2. A cartridge holder 4 is provided at a right portion of an upper surface of the main body 2. The cartridge holder 4 is a recess in which the tape cartridge 100 is removably mountable. An output opening 6 is formed in a right portion of a front surface of the main body 2. The tape 10 having been printed is discharged from the cartridge holder 4 to the outside of the printer 1 through the output opening 6.

Figure 2:
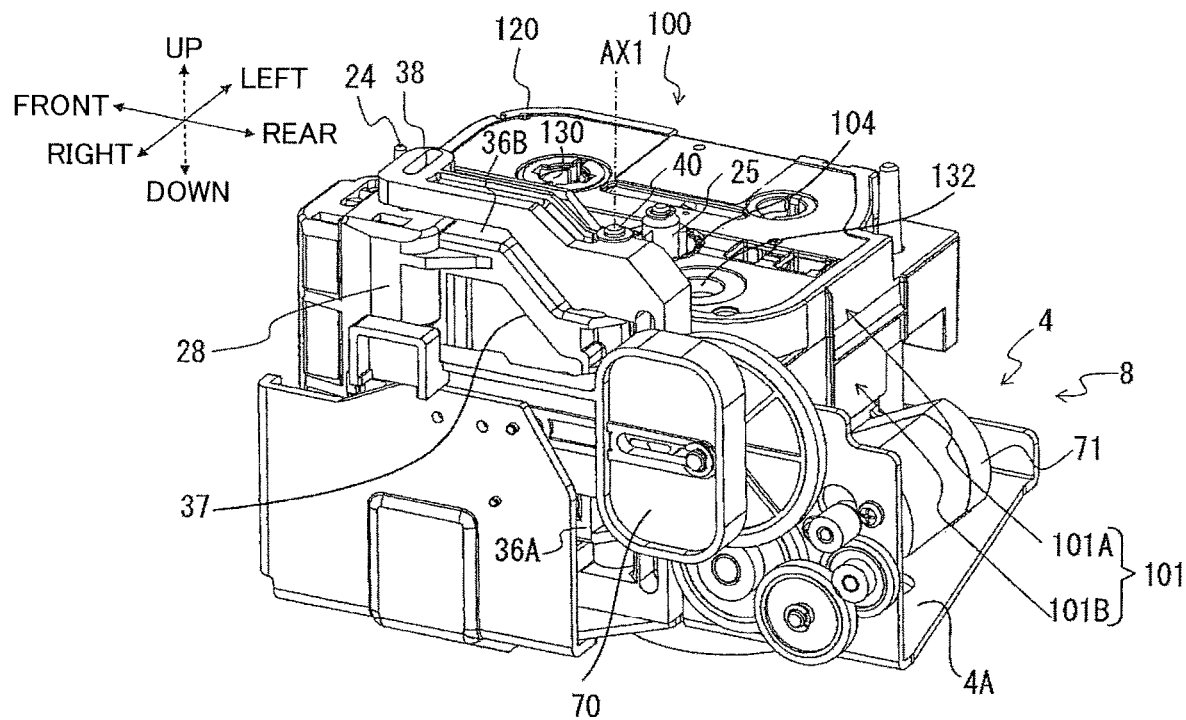
FIG. 2 is a perspective view of an internal unit 8.
Figure 3:
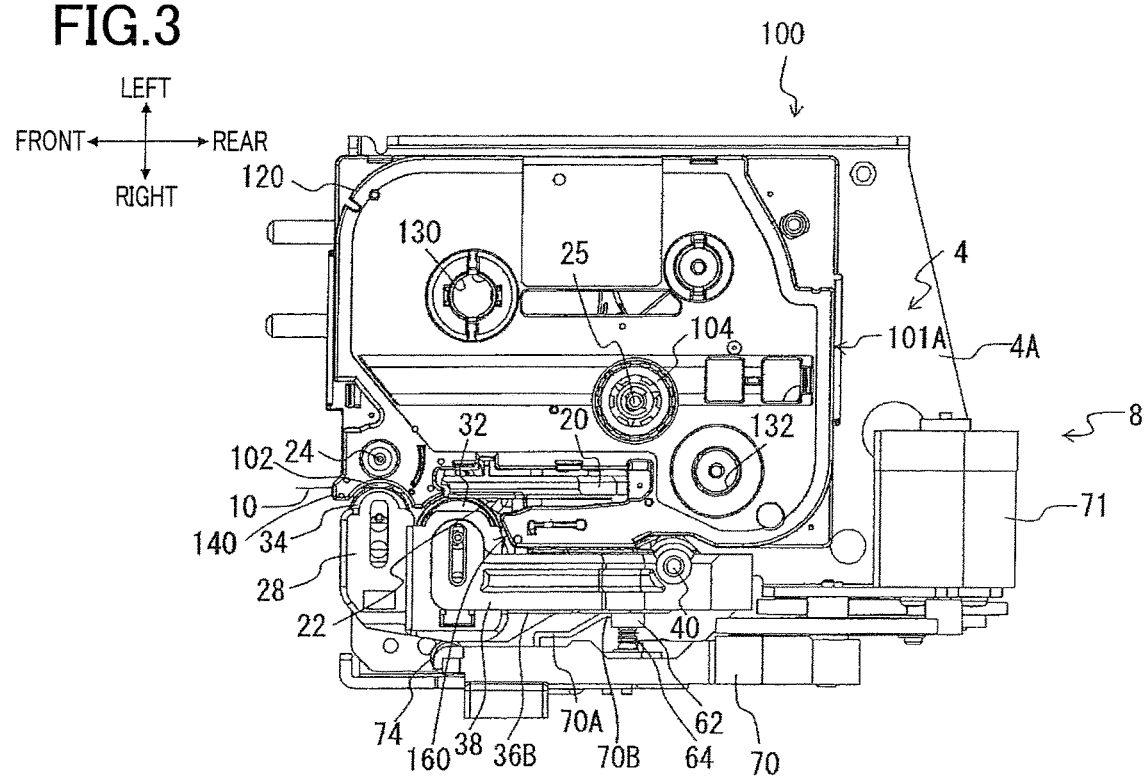
FIG. 3 is a plan view of the internal unit 8.
Figure 4:
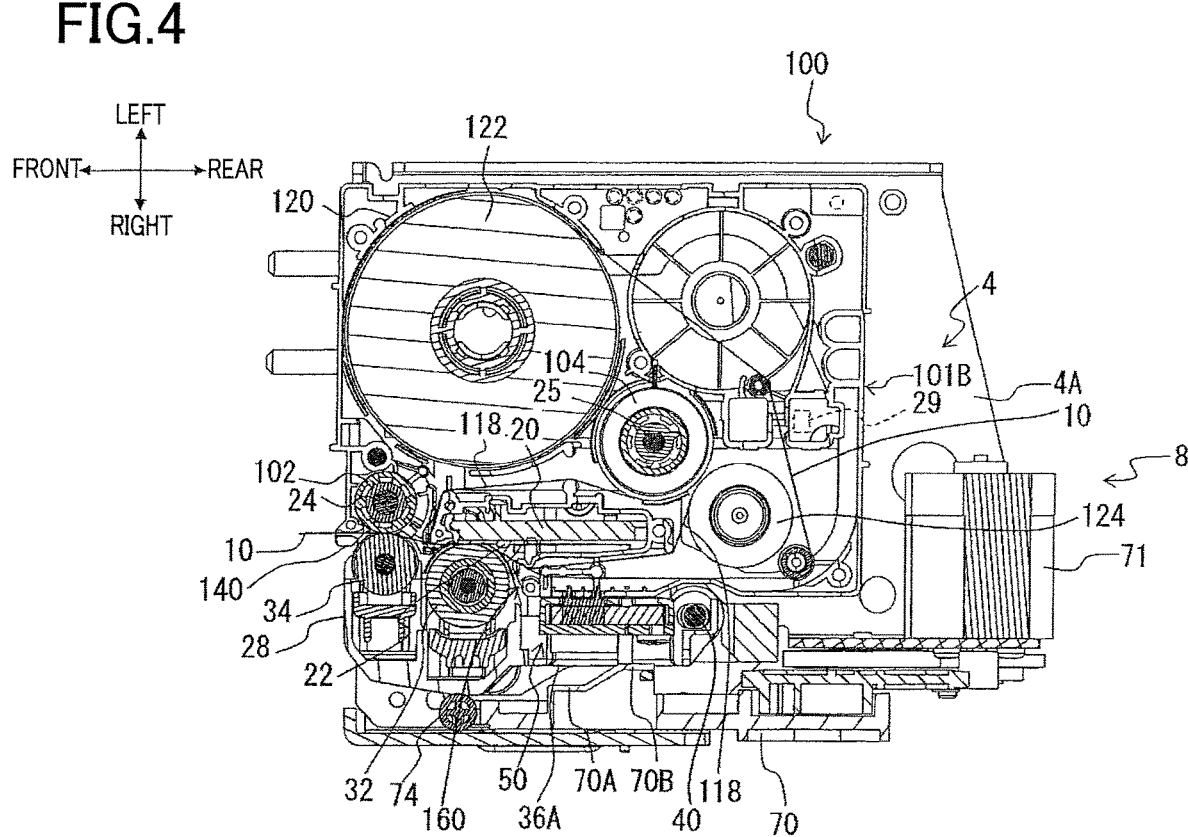
FIG. 4 is a cross-sectional view of the internal unit 8.

As illustrated in FIGS. 2-4, an internal unit 8 is provided at a right portion of the main body 2. The internal unit 8 includes a bottom plate 4A that constitutes a bottom surface of the cartridge holder 4. A head holder 20 is provided upright at a right portion of a substantially central portion of the cartridge holder 4 in the front and rear direction. A thermal head 22 including heating elements, not illustrated, is provided on a right surface of the head holder 20. The thermal head 22 performs printing on the tape 10 conveyed along a predetermined conveyance path by, e.g., a platen roller 32 which will be described below. A ribbon take-up shaft 25 is provided upright on the cartridge holder 4 at a position located to the left of the head holder 20. A conveying-roller drive shaft 24 is provided upright on the cartridge holder 4 at a position located in front of the head holder 20. When the tape cassette 100 is mounted on the cartridge holder 4, the ribbon take-up shaft 25 is inserted and fitted in a ribbon take-up roller 104 which will be described below, and the conveying-roller drive shaft 24 is inserted and fitted in a conveying roller 102 which will be described below.

A drive motor, not illustrated, as a stepping motor is provided in the main body 2 at a position located outside the cartridge holder 4. The ribbon take-up shaft 25, the conveying-roller drive shaft 24, and the platen roller 32 which will be described below are connected to a drive motor via a plurality of gears, not illustrated, and rotated by power generated by the drive motor. As a result, the ribbon take-up shaft 25 fitted in the ribbon take-up roller 104 rotates the ribbon take-up roller 104. The conveying-roller drive shaft 24 fitted in the conveying roller 102 rotates the conveying roller 102. The platen roller 32 conveys the tape 10 and an ink ribbon 118 as will be described below.

As illustrated in FIGS. 2 and 4, the tape cassette 100 according to the present embodiment includes a cassette casing 101 having a substantially rectangular parallelepiped shape. The cassette casing 101 includes an upper first casing portion 101A and a lower second casing portion 101B. The casing portions 101A, 101B are fixed to each other as one unit. A roll storatge 120 provided in the cassette casing 101 stores: a tape roll 122 that is a roll of the tape 10; and a ribbon roll 124 that is a roll of the ink ribbon 118. The tape roll 122 is rotatably supported in a support hole 130 at a front left portion of the roll storatge 120. The ribbon roll 124 is rotatably supported in a support hole 132 at a rear right portion of the roll storatge 120. The ribbon take-up roller 104 is rotatably supported by a shaft between the tape roll 122 and the ribbon roll 124 in the cassette casing 101. The ribbon take-up roller 104 is rotated by the ribbon take-up shaft 25 to draw the ink ribbon 118 from the ribbon roll 124 and take up the used ink ribbon 118. The ink ribbon 118 has black ink, for example. Specifically, the ink ribbon 118 has an ink layer and a substrate. The substrate is formed of resin such as polyethylene terephthalate (PET). The ink layer contains a color component and a binder component such as wax and/or resin. In the case where the ink ribbon 118 has black ink, the color component contained in the ink layer is carbon, for example.

As illustrated in FIGS. 3-6, the cassette casing 101 includes an arm 160 extending frontward from a rear right portion of the roll storage 120. The arm 160 includes: a first arm 160A located near the first casing portion 101A; and a second arm 160B located near the second casing portion 101B. An unused tape 10 drawn from the tape roll 122 and an unused ink ribbon 118 drawn from the ribbon roll 124 are guided in the arm 160. The tape 10 is guided in the arm 160 in a state in which the widthwise direction of the tape 10 is parallel with the up and down direction, a fourth surface 12B of a printing sheet 12 (see FIGS. 8-12) which will be described below faces leftward, and a first surface 11A of a separation sheet 11 (see FIGS. 8-12) which will be described below faces rightward. The ink ribbon 118 is guided in the arm 160 at a position located to the left of the tape 10 in a state in which the widthwise direction of the tape 10 is parallel with the up and down direction. After guided frontward in the arm 160, the tape 10 and the ink ribbon 118 are arranged on one another in an opening 161 formed in the front end of the arm 160 and are discharged frontward from the arm 160.

The conveying roller 102 is rotatably supported by a shaft in the cassette casing 101 at a position located in front of the arm 160. An output guide 140 is provided at a front right corner of the cassette casing 101. A pressing roller 34, which will be described below, is opposed to the conveying roller 102. When rotated by the conveying-roller drive shaft 24, the conveying roller 102 is cooperated with the pressing roller 34 to draw the tape 10 from the tape roll 122 and convey the printed tape 10 toward the output opening 6 via the output guide 140. It is noted that the ink ribbon 118 is guided toward the ribbon take-up roller 104 at a position located upstream of the conveying roller 102 in the conveying direction.

Figure 6:
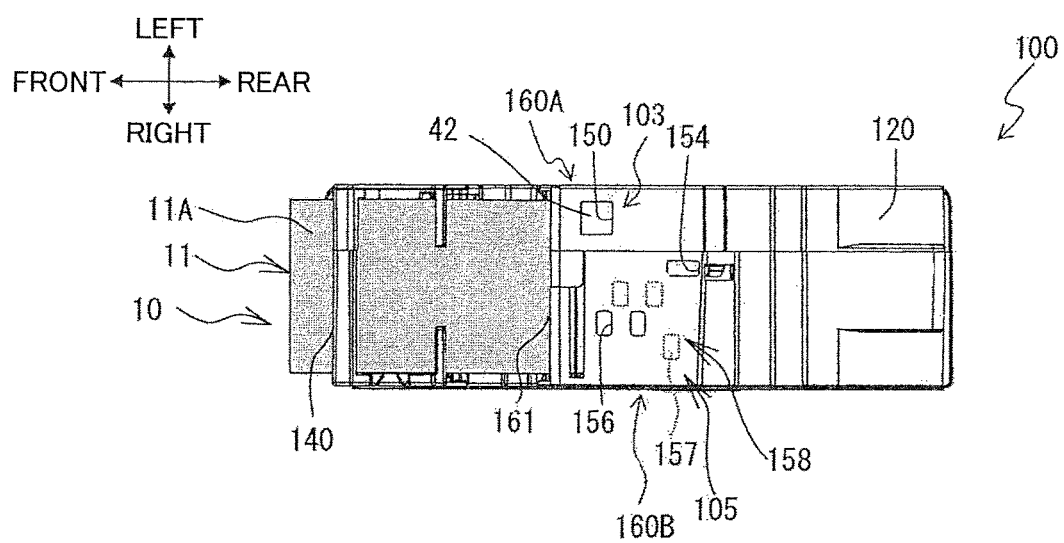
FIG. 6 is a right side view of a tape cassette 100.

As illustrated in FIG. 6, the first casing portion 101A includes a right wall 103 of the first arm 160A. The right wall 103 has a detection hole 150 extending through the right wall 103 and having a substantially rectangular shape. The detection hole 150 is formed at a position opposed to a path of movement of various kinds of labels (see FIGS. 8-12), which will be described below, disposed on the tape 10 conveyed in the arm 160. The detection hole 150 is used for an optical sensor 56 (see FIG. 7), which will be described below, to optically detect the various kinds of labels which will be described below. A detailed configuration of this will be described below.

The second casing portion 101B includes a right wall 105 of the second arm 160B which is located under the right wall 103 of the first arm 160A. The right wall 105 has: an indicator portion 158 indicating information relating to the tape 10; and an insertion hole 154 having a substantially rectangular shape. The indicator portion 158 defines the information relating to the tape 10, such as the width of the tape 10, in accordance with combinations of insertion holes 156 or surface portions 157 respectively corresponding to sensor protrusions 66 which will be described below. The insertion hole 154 is a hole into which a guide protrusion 58 (see FIG. 7) which will be described below is inserted.

As illustrated in FIGS. 2-5, a pivotably supporting portion 38 having a three-sided rectangular shape extending in the front and rear direction is provided to the right of the head holder 20 in the cartridge holder 4. The pivotably supporting portion 38 supports holder arms 36A, 36B each extending in the front and rear direction, such that the holder arms 36A, 36B are interposed between opposed portions of the pivotably supporting portion 38. Each of the holder arms 36A, 36B is pivotable about an axis AX1 by a support shaft 40 extending in the up and down direction. The first holder arm 36A is disposed in a lower portion of an inner space of the pivotably supporting portion 38. The second holder arm 36B is disposed in an upper portion of the inner space of the pivotably supporting portion 38, that is, the second holder arm 36B is disposed above the first holder arm 36A.

A roller holder 28 is supported by the holder arms 36A, 36B so as to be pivotable about the axis AX1 with the holder arms 36A, 36B. The platen roller 32 and the pressing roller 34 are rotatably provided on the roller holder 28. The platen roller 32 is opposed to the thermal head 22 such that a roller surface of the platen roller 32 is exposed leftward. The pressing roller 34 is opposed to the conveying-roller drive shaft 24 such that a roller surface of the pressing roller 34 is exposed leftward.

A torsion spring, not illustrated, is mounted on a lower end portion of the support shaft 40. The torsion spring resiliently urges the holder arms 36A, 36B and the roller holder 28 rightward (away from the thermal head 22) about the axis AX1. In a state in which each of the holder arms 36A, 36B and the roller holder 28 is not pressed leftward (toward the thermal head 22), each of the holder arms 36A, 36B and the roller holder 28 is kept at a release position (illustrated in FIG. 5) by an urging force of the torsion spring. In the case where each of the holder arms 36A, 36B and the roller holder 28 is located at the release position, the platen roller 32 and the pressing roller 34 are separated respectively from the thermal head 22 and the conveying roller 102.

When pressed rightward against the urging force of the torsion spring, each of the holder arms 36A, 36B and the roller holder 28 pivots rightward from the release position to a printing position (illustrated in FIGS. 3 and 4). In the case where each of the holder arms 36A, 36B and the roller holder 28 is located at the printing position, the platen roller 32 and the pressing roller 34 presses the tape 10 located on the conveyance path, respectively against the thermal head 22 and the conveying roller 102. When the platen roller 32, the pressing roller 34, and the conveying-roller drive shaft 24 (the conveying roller 102) are rotated in the state in which the tape cassette 100 is mounted on the cartridge holder 4, and each of the holder arms 36A, 36B and the roller holder 28 is located at the printing position, the tape 10 contained in the tape cassette 100 is conveyed along the predetermined conveyance path.

Figure 5:
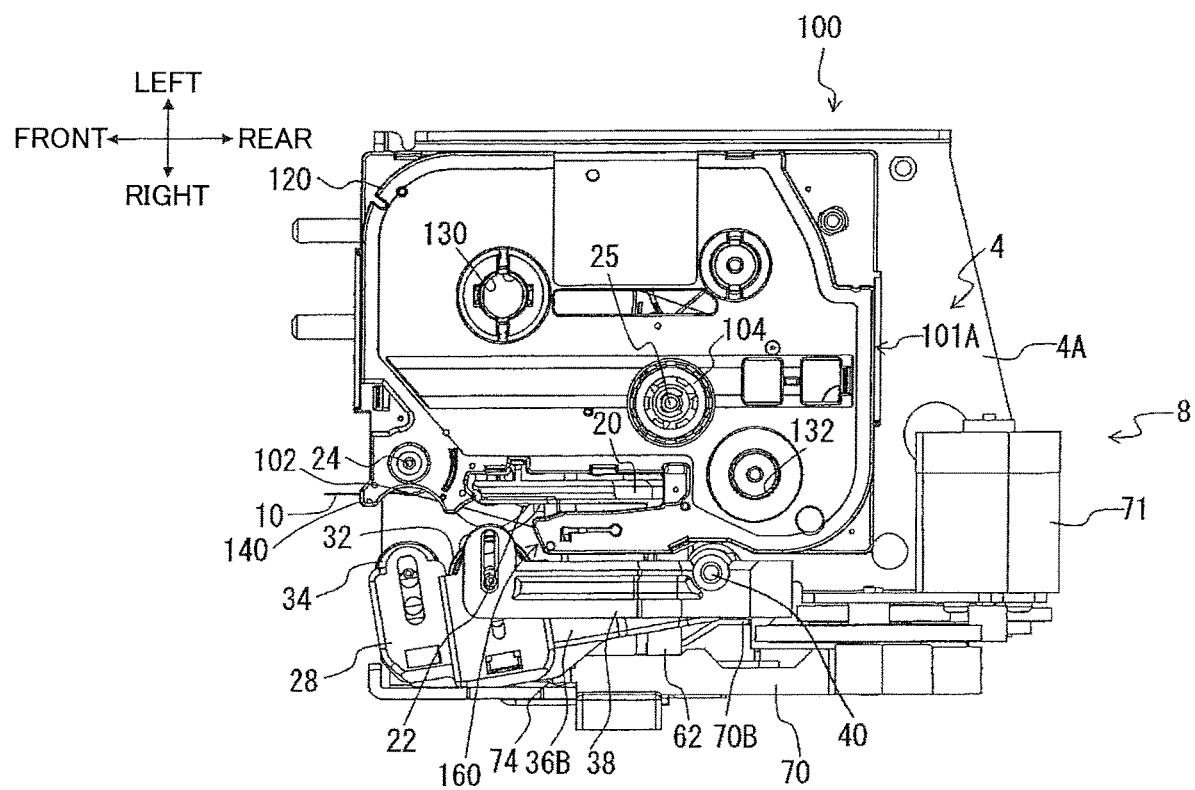
FIG. 5 is a plan view of the internal unit 8.

As illustrated in FIGS. 3-5, a release rod 70 and a release motor 71 are provided on the main body 2. The release rod 70 is disposed to the right of the holder arms 36A, 36B so as to extend in the front and rear direction. A left portion of the release rod 70 includes a first engaging portion 70A and a second engaging portion 70B. The first engaging portion 70A extends on a front right side of the second engaging portion 70B. The release motor 71 is mechanically coupled to the release rod 70 and driven to move the release rod 70 in the front and rear direction.

A pressing portion 74 shaped like a roller is provided at a front end portion of the release rod 70. When the release rod 70 is moved frontward by the release motor 71, the pressing portion 74 is also moved frontward and brought into contact with the roller holder 28. With this operation, each of the holder arms 36A, 36B and the roller holder 28 is rotated rightward about the axis AX1 and thereby moved from the release position to the printing position. When the release rod 70 is moved rearward by the release motor 71, the pressing portion 74 is moved rearward and thereby separated from the roller holder 28. This separation causes each of the holder arms 36A, 36B and the roller holder 28 to be rotated leftward about the axis AX1 and thereby moved from the printing position to the release position.

As illustrated in FIG. 4, a sensor 29 is provided on a rear portion of the cartridge holder 4 at a substantially center of the cartridge holder 4 in the right and left direction. The sensor 29 optically detects a terminal-end mark, not illustrated, provided on the tape 10 of the tape cassette 100 mounted on the cartridge holder 4. The terminal-end mark will be described later.

Figure 7:
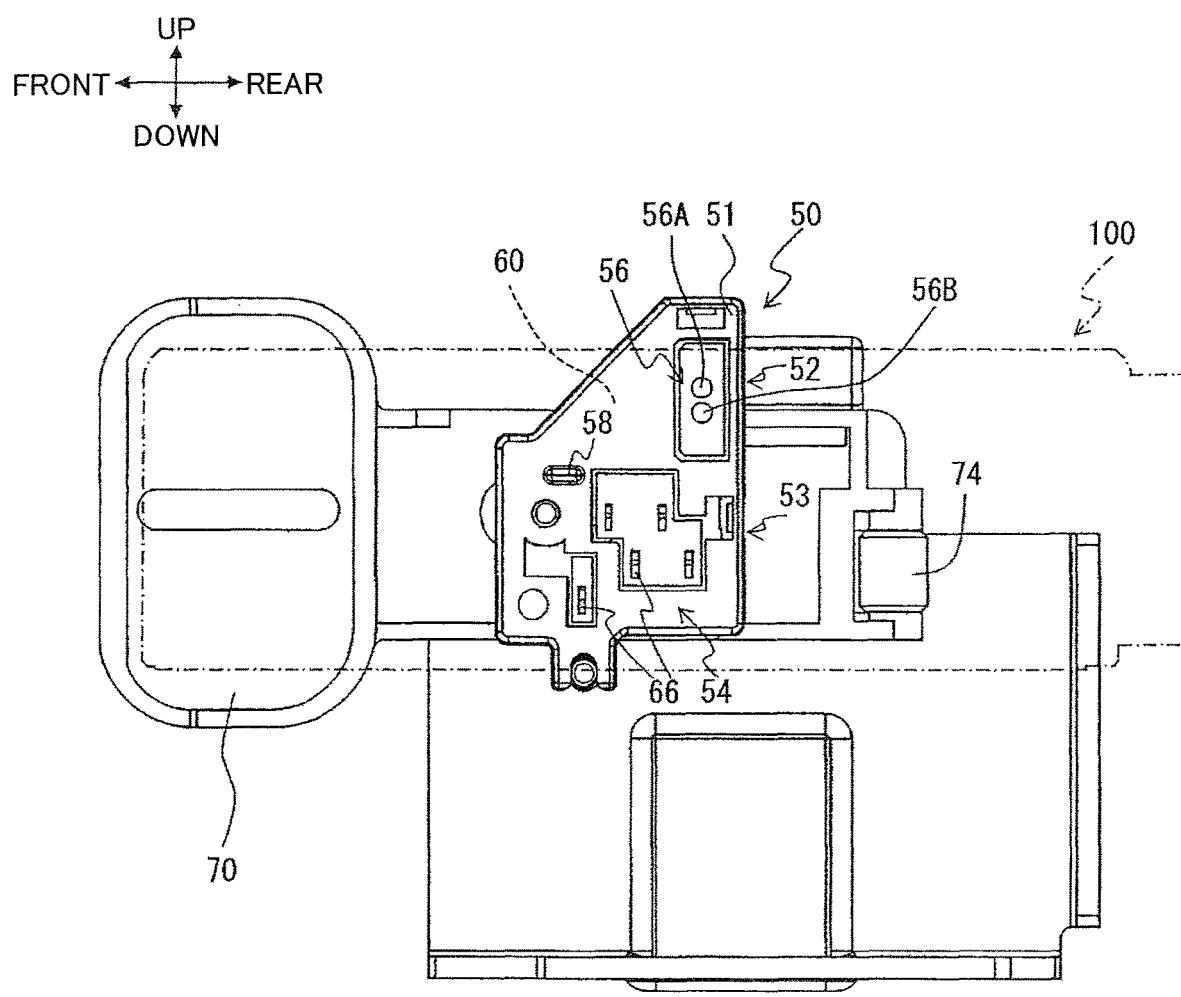
FIG. 7 is a plan view of a sensor unit 50 and components around the sensor unit 50.

As illustrated in FIG. 7, a sensor unit 50 movable with respect to the tape cassette 100 mounted on the cartridge holder 4 is provided to the left of the release rod 70 in the main body 2. The sensor unit 50 includes a mechanical sensor 54 and the optical sensor 56 as one unit. The sensor unit 50 is inserted in a space 37 (see FIG. 2) formed between the holder arms 36A, 36B. The space 37 is located upstream of the thermal head 22 in the conveying direction. The sensor unit 50 includes a circuit board 60 shaped like a plate and a unit body 51 shaped like a box. The circuit board 60 is located to the right of the unit body 51. The circuit board 60 is connected to a control circuit, not illustrated, of the printer 1 via a cable, not illustrated, connected to a connector, not illustrated, provided on the circuit board 60.

The mechanical sensor 54 includes a plurality of the sensor protrusions 66 (five sensor protrusions 66 in this example) provided at a substantially quadrangle portion 53 of a left surface of the circuit board 60. Each of the sensor protrusions 66 protrudes through an opening formed in the unit body 51, to a position located to the left of a left surface of the unit body 51. When the tape cassette 100 is mounted on the cartridge holder 4, and the sensor unit 50 is moved to a detecting position which will be described later, the indicator portion 158 (see FIG. 6) of the arm 160 is opposed to one or ones of the sensor protrusions 66. The sensor protrusions 66 opposed to the insertion holes 156 (see FIG. 6) are inserted in the insertion holes 156 and set at OFF. The sensor protrusions 66 opposed to the surface portions 157 (see FIG. 6) are pressed by the surface portions 157 and set at ON. The control circuit, not illustrated, of the printer 1 detects information about the width of the tape 10 based on combination of ON and OFF of the sensor protrusions 66.

The optical sensor 56 is provided on a substantially triangle portion 52 of the left surface of the circuit board 60. The optical sensor 56 is a reflective optical sensor capable of optically detecting an object through the opening formed in the unit body 51. The optical sensor 56 includes a light emitting element 56A and a light receiving element 56B arranged in the up and down direction. The light emitting element 56A is a light-emitting diode (LED) configured to emit near-infrared light (0.8 µm to 1.0 µm), for example. The light receiving element 56B is a photodiode having sensitivity to the near-infrared light, for example. When the tape cassette 100 is mounted on the cartridge holder 4, and the sensor unit 50 is moved to the detecting position which will be described later, the detection hole 150 formed in the arm 160 (see FIG. 6) is opposed to the optical sensor 56. When light emitted from the light emitting element 56A into the detection hole 150, the light illuminates a portion of the tape 10 which is opposed to the detection hole 150. The light receiving element 56B receives light reflected from the tape 10 via the detection hole 150. The control circuit, not illustrated, of the printer 1 is capable of detecting various kinds of information relating to the tape 10 based on a result of detection of the optical sensor 56, but the detail of which will be described later. It is noted that the optical sensor 56 may be of a transmission type.

The guide protrusion 58 is provided at an upper rear portion of the substantially quadrangle portion 53 of the unit body 51. When the tape cassette 100 is mounted on the cartridge holder 4, and the sensor unit 50 is moved to the detecting position which will be described later, the insertion hole 154 (see FIG. 6) formed in the arm 160 is opposed to the guide protrusion 58, and the guide protrusion 58 is inserted in the insertion hole 154.

A cylindrical portion 62 (see FIG. 3) is provided at the substantially quadrangle portion 53 of the unit body 51 so as to extend to a position located to the right of a right surface of the circuit board 60, via the through hole formed in the circuit board 60. A coil spring 64 (see FIG. 3) is provided in the cylindrical portion 62. The coil spring 64 resiliently urges the sensor unit 50 leftward. A guide portion, not illustrated, extending downward is provided near a right end portion of the cylindrical portion 62. The guide portion of the cylindrical portion 62 is engaged with the first engaging portion 70A or the second engaging portion 70B (see FIG. 3) of the release rod 70. Leftward movement of the sensor unit 50 by the urging force of the coil spring 64 is inhibited by the engagement between the guide portion and the first engaging portion 70A or the second engaging portion 70B.

When the release rod 70 is moved frontward by the release motor 71, the guide portion of the cylindrical portion 62 is moved from the first engaging portion 70A to the second engaging portion 70B with leftward movement of the sensor unit 50. When the guide portion of the cylindrical portion 62 is engaged with the second engaging portion 70B, the sensor unit 50 is kept at the detecting position (illustrated in FIGS. 3 and 4). When the sensor unit 50 is located at the detecting position, the sensor protrusions 66 of the mechanical sensor 54 are opposed to the indicator portion 158, the guide protrusion 58 is inserted in the insertion hole 154, and the optical sensor 56 is opposed to the detection hole 150.

When the release rod 70 is moved rearward by the release motor 71, the guide portion is moved from the second engaging portion 70B to the first engaging portion 70A with rightward movement of the sensor unit 50. When the guide portion of the cylindrical portion 62 is engaged with the first engaging portion 70A, the sensor unit 50 is kept at the release position (illustrated in FIG. 5). When the sensor unit 50 is located at the release position, the sensor protrusions 66 of the mechanical sensor 54 are separated from the indicator portion 158, the guide protrusion 58 is separated from the insertion hole 154, and the optical sensor 56 is separated from the detection hole 150.

Figure 8:
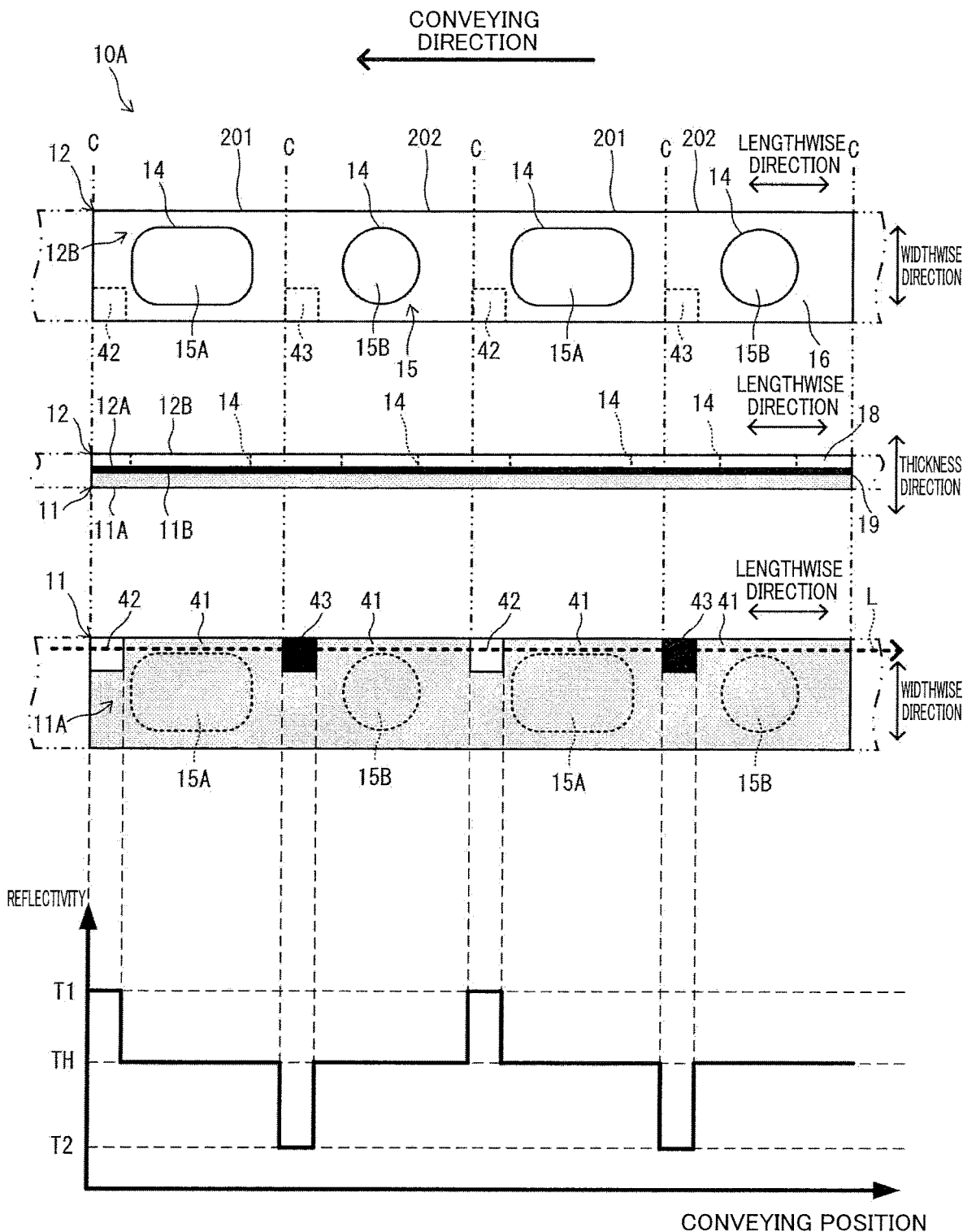
FIG. 8 is a view for explaining a tape 10A.
Figure 9:
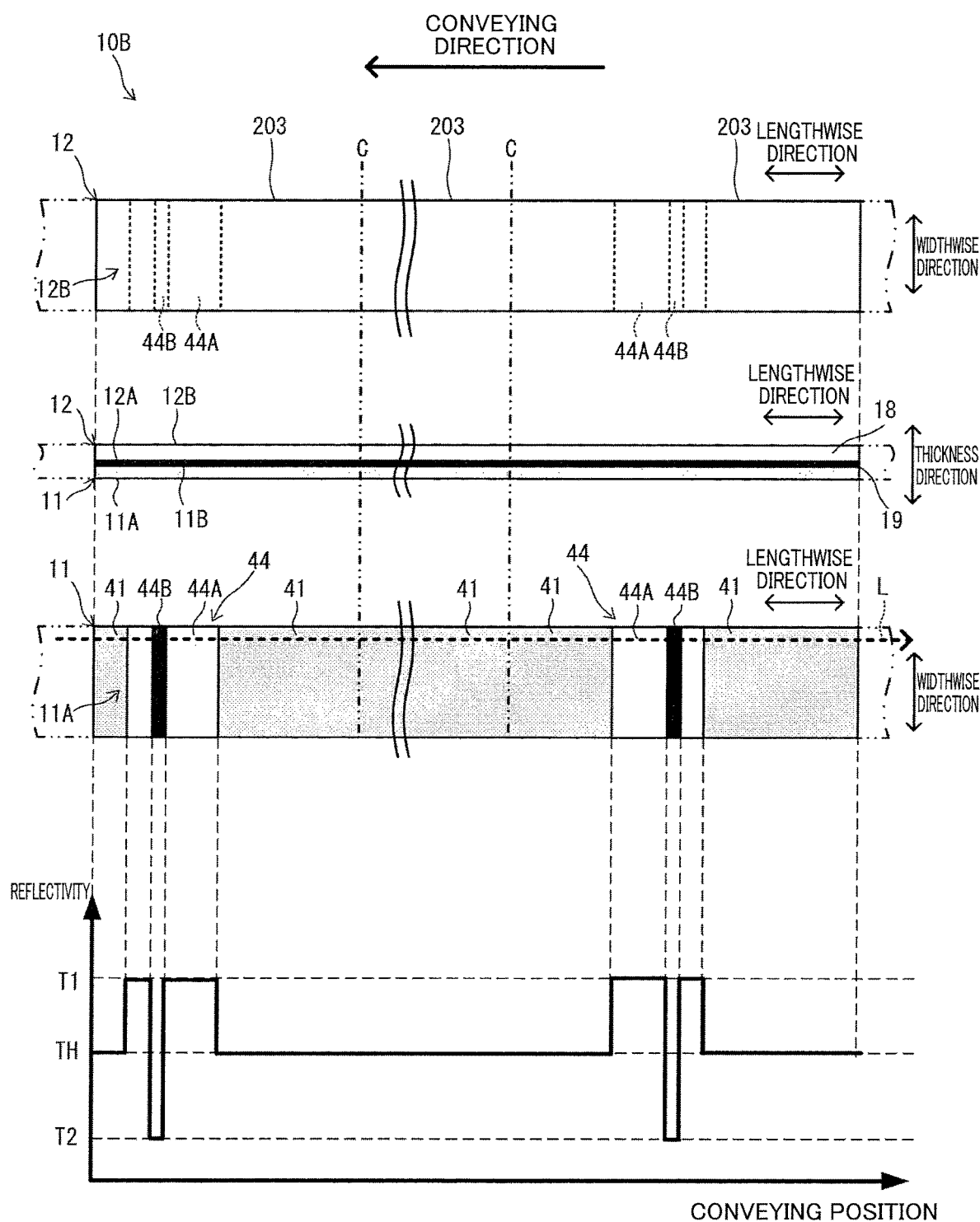
FIG. 9 is a view for explaining a tape 10B.
Figure 10:
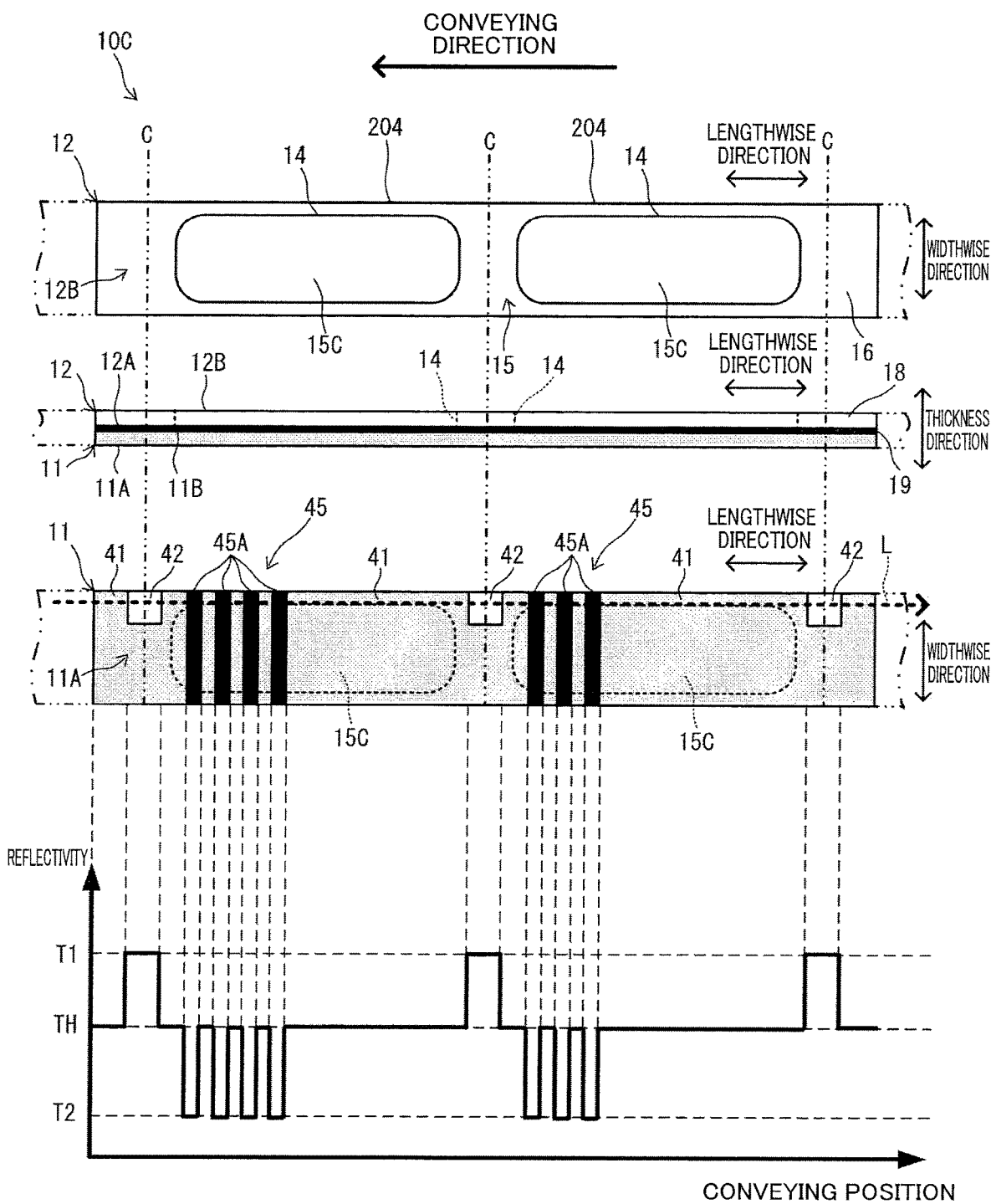
FIG. 10 is a view for explaining a tape 10C.
Figure 11:
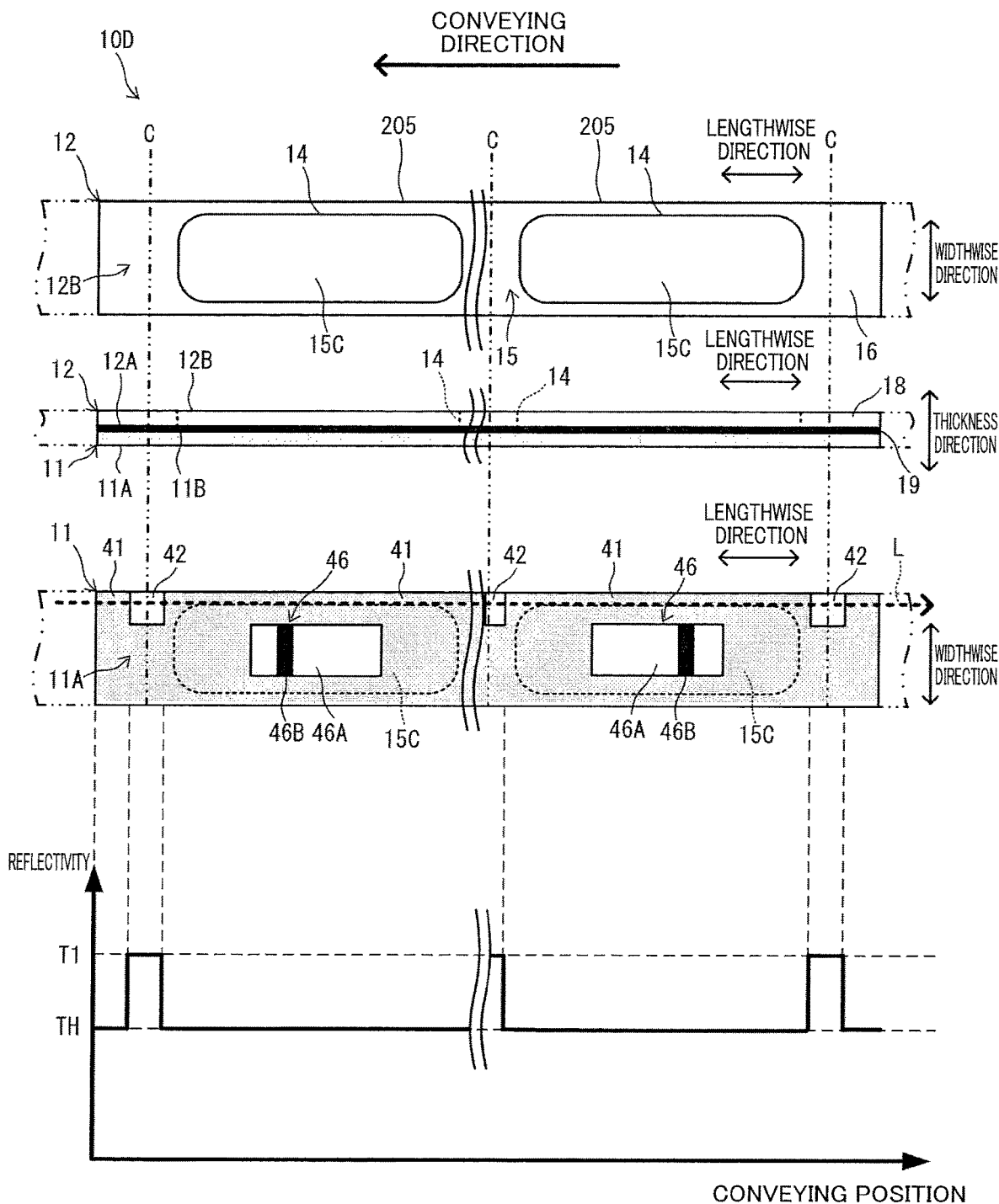
FIG. 11 is a view for explaining a tape 10D.
Figure 12:
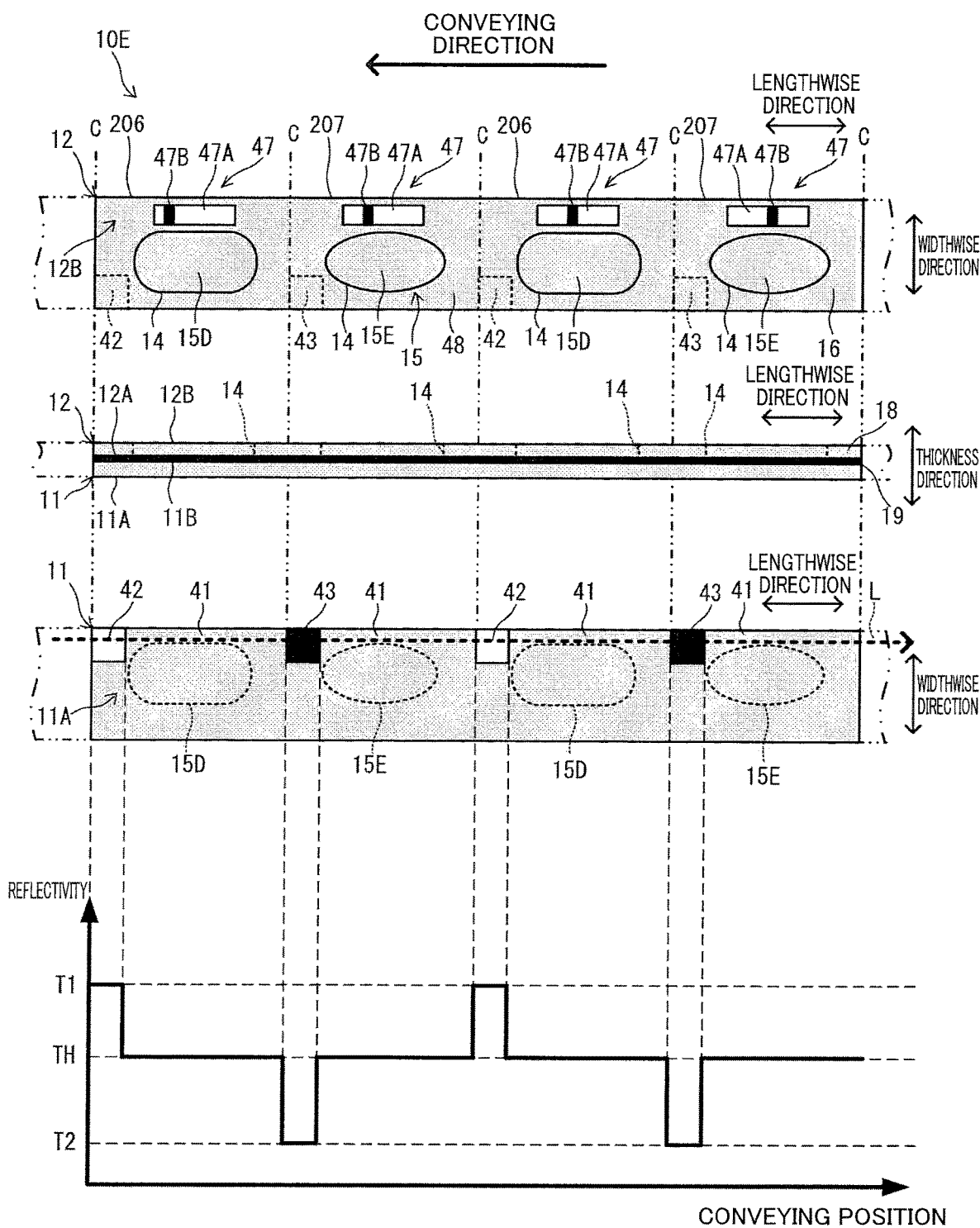
FIG. 12 is a view for explaining a tape 10E.

There will be next described a configuration of the tape 10 with reference to FIGS. 8-12. A tape 10A illustrated in FIG. 8 is a first example of the tape 10. A tape 10B illustrated in FIG. 9 is a second example of the tape 10. A tape 10C illustrated in FIG. 10 is a third example of the tape 10. A tape 10D illustrated in FIG. 11 is a fourth example of the tape 10. A tape 10E illustrated in FIG. 12 is a fifth example of the tape 10. As illustrated in FIGS. 8-12, the tape 10 is shaped like a strip extending in its lengthwise direction and its widthwise direction. The lengthwise direction coincides with a direction in which the tape 10 of the tape roll 122 (see FIG. 4) is drawn and conveyed by the printer 1 (see FIG. 1). The widthwise direction coincides with a direction orthogonal to the lengthwise direction and corresponds to the widthwise direction of the tape 10. The direction of the tape 10 which is orthogonal to each of the lengthwise direction and the widthwise direction is a thickness direction.

The tape 10 includes the separation sheet 11 and the printing sheet 12. The separation sheet 11 has opposite surfaces in the thickness direction, namely, the first surface 11A and a second surface 11B. In the present example, the separation sheet 11 is release paper (such as glassine, high-quality paper, or kraft paper) covered with a release agent formed of a silicon-based material, for example. The separation sheet 11 may be formed of a material other than the release paper. For example, the separation sheet 11 may be a release film formed of a resin film. In the present example, the ground color of the separation sheet 11 is a color (gray) between white and black. Thus the color of each of the first surface 11A and the second surface 11B is gray corresponding to the ground color of the separation sheet 11. The printing sheet 12 has a printing layer 18 and an adhesive layer 19 stacked on each other in the thickness direction. The printing layer 18 has opposite surfaces in the thickness direction, namely, a third surface 12A and the fourth surface 12B. The printing layer 18 is a film formed of resin such as PET, PVC, PP, PE, PS, and ABS. The adhesive layer 19 is a transparent layer formed of adhesive and disposed on the third surface 12A. The adhesive layer 19 contains acrylic adhesive, for example. In the present example, the ground color of the printing layer 18 is white. The color of each of the third surface 12A and the fourth surface 12B is white corresponding to the ground color of the printing layer 18. The printing sheet 12 is peelably stuck to the second surface 11B, with the adhesive layer 19 interposed therebetween. The thermal head 22 (see FIG. 4) forms an image on the fourth surface 12B by thermal transfer of the ink ribbon 118.

To form the tape roll 122 (see FIG. 4), the tape 10 according to the present embodiment is rolled in a state in which the printing sheet 12 is located on an inner circumferential side, and the separation sheet 11 is located on an outer circumferential side. Though not illustrated, the terminal-end mark having a grid pattern is printed on a trailing end portion of the first surface 11A in the conveying direction. The printer 1 uses the sensor 29 (see FIG. 4) to detect the terminal-end mark to determine that a remaining amount of the tape 10 of the tape roll 122 is small.

The printer 1 cuts the printed tape 10 into the predetermined length to create a label piece. The user can peel the printing sheet 12 of the created label piece from the separation sheet 11 and stick the printing sheet 12 to an object such as a cable. The printer 1 according to the present embodiment may use the tape 10 of a die-cut label type and the tape 10 of a normal label type. Half cut is formed in the tape 10 of the die-cut label type to divide the printing sheet 12 into a label portion and a non-label portion. No half cut is formed in the printing sheet 12 of the tape 10 of the normal label type.

There will be next described the tape 10A illustrated in FIG. 8 in detail. The tape 10A is of the die-cut label type for creating the label piece having the fixed length. The printing sheet 12 has a plurality of half cuts 14 formed by half cut. In other words, each of the half cuts 14 extends through the printing sheet 12 but not through the separation sheet 11. Each of the half cuts 14 has a closed outline. Portions of the printing sheet 12 which are enclosed by the respective half cuts 14 serve as label portions 15. That is, the printing sheet 12 has the label portions 15 corresponding to the respective half cuts 14.

The label portions 15 include labels 15A and labels 15B. Each of the labels 15A and each of the labels 15B are different in shape from each other. Each of the labels 15A has a rectangular shape elongated in the lengthwise direction of the tape 10A. Each of the labels 15B has a round shape. In the present example, the labels 15A and the labels 15B are arranged in the lengthwise direction at a central region of the tape 10A in the widthwise direction. The labels 15A, 15B are alternately arranged at predetermined intervals. A portion of the printing sheet 12 which is different from the label portions 15 is a non-label portion 16. In the present example, the tape 10A has the non-label portion 16 as a portion of the printing sheet 12 but may not have the non-label portion 16 such that a portion of the separation sheet 11 which corresponds to the non-label portion 16 is exposed.

Label markers 42, 43 are provided on the first surface 11A of the separation sheet 11. Each of the label markers 42 is a white region printed with ink containing white pigment. The white pigment is well-known inorganic white pigment, examples of which include: sulfate and carbonate as alkaline-earth-metal compounds; silicas such as powdered silica and synthetic silicate; calcium silicate; alumina, alumina hydrate; titanium oxide; zinc oxide; talc; and clay. Each of the label markers 43 is a black region printed with ink containing black pigment.

In the present example, the label markers 42 and the label markers 43 having the same quadrangle shape are provided at one end portion (i.e., an upper end portion) of the first surface 11A in the widthwise direction. The label markers 42 and the label markers 43 are alternately arranged in the lengthwise direction at predetermined intervals. A plurality of regions on the first surface 11A, each of which is adjacent to at least one of the label markers 42, 43 in the lengthwise direction, are a plurality of ground-color markers 41. The ground-color markers 41 each having the ground color (gray) of the first surface 11A correspond to the respective label portions 15.

The label markers 42 are provided corresponding to the respective labels 15A. Each of the label markers 42 is located downstream of a corresponding one of the labels 15A and upstream of a first downstream label in the conveying direction in which the tape 10A is conveyed. The first downstream label is one of the labels 15B which is located downstream of and adjacent to the corresponding one of the labels 15A in the conveying direction. Specifically, an upstream end portion of each of the label markers 42 is located downstream of a downstream end portion of the corresponding one of the labels 15A in the conveying direction. A downstream end portion of each of the label markers 42 is located upstream of an upstream end portion of the corresponding first downstream label in the conveying direction. In the present example, the position of the downstream end portion of each of the label markers 42 is the same as a cut position C of an upstream end portion of a label piece 202 which will be described below.

The label markers 43 are provided corresponding to the respective labels 15B. Each of the label markers 43 is located downstream of a corresponding one of the labels 15B and upstream of a second downstream label in the conveying direction. The second downstream label is one of the labels 15A which is located downstream of and adjacent to the corresponding one of the labels 15B in the conveying direction. Specifically, an upstream end portion of each of the label markers 43 is located downstream of a downstream end portion of the corresponding one of the labels 15B in the conveying direction. A downstream end portion of each of the label markers 43 is located upstream of an upstream end portion of the corresponding second downstream label in the conveying direction. In the present example, the position of the downstream end portion of each of the label markers 43 is the same as a cut position C of an upstream end portion of a label piece 201 which will be described below.

Each of the ground-color markers 41, each of the label markers 42, and each of the label markers 43 are opposed to the detection hole 150 (see FIG. 6) in the thickness direction when the tape 10A is conveyed. Light L emitted from the optical sensor 56 (see FIG. 7) impinges on the label marker 42, the ground-color marker 41, the label markers 43, the ground-color marker 41, the label marker 42, the ground-color marker 41, the label markers 43, and so on in this order during conveyance of the tape 10A. In the present example, each of the ground-color markers 41 (i.e., the gray region) has reflectivity TH to light with a particular wavelength. The reflectivity TH is not particular reflectivity but is reflectivity of a particular width which has reflectivity close to the particular reflectivity. The light with the particular wavelength is the light L emitted from the light emitting element 56A of the optical sensor 56. It is noted that the particular wavelength may have a certain degree of range. For example, the particular wavelength is a wavelength range with sensitivity to light reception of the light receiving element 56B of the optical sensor 56.

Since each of the label markers 42 is a white region brighter than the gray region, the reflectivity of the label markers 42 to the light with the particular wavelength is greater than the reflectivity TH. That is, the reflectivity of the label markers 42 to the light with the particular wavelength is greater than that of the ground-color markers 41 to the light with the particular wavelength. Since each of the label markers 43 is a black region darker than the gray region, the reflectivity of the label markers 43 to the light with the particular wavelength is less than the reflectivity TH. That is, the reflectivity of the label markers 43 to the light with the particular wavelength is less than that of the ground-color markers 41 to the light with the particular wavelength.

In the tape 10A, the label markers 42 and the label markers 43 are the same as each other in position in the widthwise direction. The label markers 42 and the label markers 43 are the same as each other in position in the lengthwise direction. It is noted that an upstream end portion of the white marker (the label marker 42) nearest to a downstream end of the tape roll 122 in the conveying direction is located downstream, in the conveying direction, of a downstream end portion of the black marker (the label marker 43) nearest to the downstream end of the tape roll 122 in the conveying direction. In the present example, FIG. 6 illustrates an unused tape cassette 100 (e.g., at the point of sale) containing the tape 10A as the tape 10. In the unused tape cassette 100, as illustrated in FIG. 6, the most-downstream label marker 42 in the conveying direction is opposed to the detection hole 150 (see FIG. 6) in the thickness direction and exposed to the outside of the cassette casing 101 through the detection hole 150. There will be described one example of image printing and label creation using the tape 10A.

As illustrated in FIGS. 4 and 8, the printer 1 draws the tape 10A from the tape roll 122 contained in the tape cassette 100 mounted on the cartridge holder 4 and conveys the tape 10A. The control circuit, not illustrated, of the printer 1 prestores a particular intensity of the light L to be emitted. The optical sensor 56 emits the emitted light L of the particular intensity through the detection hole 150 to the first surface 11A of the tape 10A conveyed in the arm 160 and receives the light reflected from the first surface 11A. The printer 1 detects, as reflectivity, the intensity of the received reflected light. The printer 1 detects reflectivity T1 when the light L is emitted to the label marker 42, detects the reflectivity TH when the light L is emitted to the ground-color marker 41, and detects reflectivity T2 when the light L is emitted to the label marker 43 (see FIG. 8). The reflectivity T1 is greater than the reflectivity TH. The reflectivity T2 is less than the reflectivity TH. The reflectivity may be a ratio of the intensity of the reflected light to the intensity of the emitted light L. In this case, each of the reflectivity T1 and the reflectivity T2 may be a value determined in advance at a predetermined ratio with respect to the reflectivity TH as a reference.

In the present example, the control circuit, not illustrated, of the printer 1 stores label information relating to each of the labels 15A, in association with the reflectivity T1 and stores label information relating to each of the labels 15B, in association with the reflectivity T2. The label information relating to each of the labels 15A indicates the length of the label piece 201 including the label 15A, and the position, the shape, and the size of the label 15A in the label piece 201, for example. The label information relating to each of the labels 15B indicates the length of the label piece 202 including the label 15B, and the position, the shape, and the size of the label 15B in the label piece 202, for example.

When the reflectivity T1 is detected, the printer 1 prints an image on the label 15A of the conveyed tape 10A based on the label information relating to the label 15A. The printer 1 cuts the conveyed tape 10A at the cut position C located upstream of the printed label 15A. The printer 1 thereby creates the label piece 201 having an appropriate length with the image printed at an appropriate position on the label 15A. Likewise, when the reflectivity T2 is detected, the printer 1 can, based on the label information relating to each of the labels 15B, create the label piece 202 having an appropriate length with an image printed at an appropriate position in the label 15B.

The user only needs to visually check the first surface 11A of the created label piece to identify whether the created label piece is the label piece 201 or 202. For example, in the case where the label marker 42 is provided on the first surface 11A, the user need not visually check the fourth surface 12B to identify that the created label piece is the label piece 201 including the label 15A. In the case where the label marker 43 is provided on the first surface 11A, the user need not visually check the fourth surface 12B to identify that the created label piece is the label piece 202 including the label 15B.

There will be next described the tape 10B illustrated in FIG. 9 in detail. Since the tape 10B is of the normal label type for creating a label piece having a variable length, the half cuts 14 and the label portions 15 (see FIG. 8) are not provided on the tape 10B. It is noted that the tape 10B may be of the normal label type for creating the label piece having the fixed length. It is noted that the same reference numerals as used for the tape 10A (see FIG. 8) are used to designate the corresponding elements of the tape 10B, and an explanation of which is dispensed with.

A plurality of remaining-amount markers 44 are provided on the first surface 11A of the separation sheet 11 so as to be arranged in the lengthwise direction at predetermined intervals. Each of the remaining-amount markers 44 is constituted by one white marker 44A and one black marker 44B. Each of the white markers 44A is a white region like the label markers 42 (see FIG. 8). Each of the black markers 44B is a black region like the label markers 43 (see FIG. 8). A portion of the first surface 11A which is different from the remaining-amount markers 44 is the ground-color markers 41.

The white marker 44A has a rectangular shape extending across the tape 10B in the widthwise direction and extending in the lengthwise direction with a particular width. The black marker 44B has a rectangular shape extending across the tape 10B in the widthwise direction and extending in the lengthwise direction with a width less than that of the white marker 44A. The black marker 44B is stacked on a portion of the white marker 44A in the thickness direction. Specifically, since the white marker 44A is formed on the first surface 11A, the white marker 44A is in direct contact with the first surface 11A. Since the black marker 44B is formed on the white marker 44A, the black marker 44B is located on an opposite side of the white marker 44A from the first surface 11A in the thickness direction. On each of the remaining-amount markers 44, one of the black markers 44B and two of the white markers 44A disposed on opposite sides of the black marker 44B in the lengthwise direction may be formed without no space therebetween (noted that this applies to remaining-amount markers 46, 47 which will be described below).

Each of the remaining-amount markers 44 indicates a remaining amount of the tape 10B as an amount of a portion of the tape 10B which is located upstream of the remaining-amount marker 44 in the conveying direction in the tape roll 122 (see FIG. 4). The remaining-amount marker 44 indicates a remaining amount of the tape 10B based on the position of the black marker 44B relative to the white marker 44A. The remaining-amount marker 44 indicates a large remaining amount of the tape 10B when the position of the black marker 44B is close to a downstream end portion of the white marker 44A in the conveying direction. The remaining-amount marker 44 indicates a small remaining amount of the tape 10B when the position of the black marker 44B is close to an upstream end portion of the white marker 44A in the conveying direction. One of the remaining-amount markers 44 is selectively opposed to the detection hole 150 (see FIG. 6) in the thickness direction when the tape 10B is conveyed. The light L emitted from the optical sensor 56 (see FIG. 7) impinges on the remaining-amount marker 44 (the white marker 44A and the black marker 44B), the ground-color marker 41, the remaining-amount marker 44, the ground-color marker 41, and so on during conveyance of the tape 10B.

In each of the remaining-amount markers 44, the white marker 44A and the black marker 44B are the same as each other in position in the widthwise direction. A portion of the white marker 44A and the black marker 44B are different from each other in position in the lengthwise direction. There will be described one example of image printing and label creation using the tape 10B.

As illustrated in FIGS. 4 and 9, the printer 1 conveys the tape 10B as in the manner described above. The optical sensor 56 emits the light L and receives the light reflected from the first surface 11A through the detection hole 150 (see FIG. 9). In the present example, the control circuit, not illustrated, of the printer 1 stores a remaining amount of the tape 10B which is related to a conveyance distance for specifying the remaining amount. The conveyance distance for specifying the remaining amount is a distance conveyed by the tape 10B from the time point when detected reflectivity changes from the reflectivity TH to the reflectivity T1, to the time point when the detected reflectivity changes from the reflectivity T1 to the reflectivity T2. The detected reflectivity is reflectivity detected by the printer 1 based on the reflected light detected by the optical sensor 56 as described above.

The detected reflectivity changes from the reflectivity TH to the reflectivity T1 at a first time point when a position to which the light L is emitted changes from the ground-color marker 41 to the white marker 44A. The detected reflectivity changes from the reflectivity T1 to the reflectivity T2 at a second time point when the position to which the light L is emitted changes from the white marker 44A to the black marker 44B. The printer 1 can identify the remaining amount of the tape 10B based on the distance conveyed by the tape 10B from the first time point to the second time point (i.e., the conveyance distance for specifying the remaining amount). For example, the printer 1 may make notification about the identified remaining amount of the tape 10B at the start or the end of printing on the tape 10B, for example. The printer 1 may make an alert in the case where the identified remaining amount of the tape 10B is less than or equal to a predetermined threshold value.

The printer 1 creates a label piece 203 having a variable length by cutting the printed tape 10B at the cut position C related to a designated label size or a size of an image to be printed. The user only needs to visually check the first surface 11A of the created label piece 203 to identify the remaining amount of the tape 10B. That is, in the case where the remaining-amount marker 44 is provided on the first surface 11A, the user can identify the remaining amount of the tape 10B based on the position of the black marker 44B relative to the white marker 44A as described above.

There will be next described the tape 10C illustrated in FIG. 10 in detail. Similar to the tape 10A (see FIG. 8), the tape 10C is of the die-cut label type for creating the label piece having the fixed length. The label portions 15 corresponding to the respective half cuts 14 are formed in the printing sheet 12 of the tape 10C. In the present example, the label portions 15 are labels 15C each having a rectangular shape elongated in the lengthwise direction. The labels 15C are provided on a central region of the tape 10C in the widthwise direction so as to be arranged in the lengthwise direction at predetermined intervals. It is noted that the same reference numerals as used for the tape 10A are used to designate the corresponding elements of the tape 10C, and an explanation of which is dispensed with.

Similar to the label markers 42 of the tape 10A (see FIG. 8), the label markers 42 are provided on the first surface 11A of the separation sheet 11 so as to correspond to the respective labels 15C. Each of the label markers 42 is located downstream of a corresponding one of the labels 15C and upstream of a third downstream label in the conveying direction in which the tape 10C is conveyed. The third downstream label is one of the labels 15C which is located downstream of and adjacent to the corresponding one of the labels 15C in the conveying direction. Specifically, an upstream end portion of each of the label markers 42 is located downstream of a downstream end portion of the corresponding one of the labels 15C in the conveying direction. A downstream end portion of each of the label markers 42 is located upstream of an upstream end portion of the corresponding third downstream label in the conveying direction. In the present example, each of the label markers 42 extends in the lengthwise direction so as to extend over the cut position C located at an upstream end of a corresponding one of label pieces 204 which will be described below.

A plurality of remaining-amount markers 45 are provided on the first surface 11A of the separation sheet 11. The remaining-amount markers 45 are provided corresponding to the respective labels 15C so as to be arranged in the lengthwise direction at predetermined intervals. In each of the labels 15C, the remaining-amount marker 45 is located upstream of the label marker 42 in the conveying direction with a small space therebetween. In the present example, however, the label marker 42 is provided on but the remaining-amount marker 45 is not provided on the most upstream label 15C in the conveying direction (i.e., the trailing-end label 15C).

Each of the remaining-amount markers 45 is constituted by at least one black marker 45A. In the case where the remaining-amount marker 45 includes a plurality of the black markers 45A, the black markers 45A are arranged in the lengthwise direction at predetermined intervals. Each of the black markers 45A has a rectangular shape extending across the tape 10C in the widthwise direction and extending in the lengthwise direction with a particular width. That is, the black markers 45A are longer than the label markers 42 in the widthwise direction. At least a portion of each of the black markers 45A overlaps a corresponding one of the labels 15C in the thickness direction.

Each of the remaining-amount markers 45 indicates a remaining amount of the tape 10C as an amount of a portion of the tape 10C which is located upstream of the remaining-amount markers 45 in the conveying direction in the tape roll 122 (see FIG. 4). Each of the remaining-amount markers 45, specifically, the number of the black markers 45A contained in the remaining-amount marker 45, indicates the remaining number of the labels 15C, i.e., the number of the labels 15C located upstream of the remaining-amount marker 45 in the conveying direction. The remaining-amount markers 45 are opposed to the detection hole 150 (see FIG. 6) in the thickness direction when the tape 10C is conveyed. When the tape 10C is conveyed, the light L emitted from the optical sensor 56 (see FIG. 7) impinges on the label marker 42, the remaining-amount marker 45 (at least one black marker 45A), and the ground-color marker 41.

On the tape 10C, the label markers 42 and a portion of each of at least one black marker 45A are the same as each other in position in the widthwise direction. The label markers 42 and all the black markers 45A are different from each other in position in the lengthwise direction. It is noted that an upstream end portion of the most-downstream white marker (i.e., the most-downstream label marker 42) on the tape roll 122 in the conveying direction is provided downstream, in the conveying direction, of a downstream end portion of the most-downstream black marker (i.e., the most-downstream black marker 45A) on the tape roll 122 in the conveying direction. In the present example, the most-downstream label marker 42 in the conveying direction is exposed to the outside of the cassette casing 101 through the detection hole 150 in the unused tape cassette 100 (e.g., at the point of sale) as described above. There will be described one example of image printing and label creation using the tape 10C.

As illustrated in FIGS. 4 and 10, the printer 1 conveys the tape 10C as in the manner described above. The optical sensor 56 receives, through the detection hole 150, the light L reflected from the first surface 11A (see FIG. 10). In the present example, the control circuit, not illustrated, of the printer 1 stores the remaining number of the labels 15C which is related to the number of detected marks. The number of detected marks is the number of detections of the reflectivity T2 in a period extending from the time point when the detected reflectivity changes from the reflectivity T1 to the reflectivity TH, to the time point when the detected reflectivity changes from the reflectivity TH to the reflectivity T1.

The detected reflectivity changes from the reflectivity T1 to the reflectivity TH at a third time point when the position to which the light L is emitted changes from the label marker 42 to the ground-color marker 41. The detected reflectivity changes from the reflectivity TH to the reflectivity T1 at a fourth time point when the position to which the light L is emitted changes from the ground-color marker 41 to the label marker 42. In the period extending from the third time point to the fourth time point, the printer 1 detects the reflectivity T2 the number of times which is the same as the number of the black markers 45A contained in the remaining-amount marker 45. The printer 1 can identify the remaining number of the labels 15C based on the number of detections of the reflectivity T2 in the period from the third time point to the fourth time point (i.e., the number of detected marks). The printer 1 may alert or make notification about the remaining number of the labels 15C as described above.

Based on the label information about the label 15C which is stored in the control circuit, not illustrated, the printer 1 can create the label piece 204 having an appropriate length on which an image is formed at an appropriate position on the label 15C. The user only needs to visually check the first surface 11A of the created label piece 204 to identify the remaining number of the labels 15C. That is, the user can visually check the remaining-amount marker 45 on the first surface 11A to recognize the remaining number of the labels 15C based on the number of the black markers 45A.

There will be next described the tape 10D illustrated in FIG. 11 in detail. Like the tape 10C (see FIG. 10), the tape 10D is of the die-cut label type for creating the label piece having the fixed length. The label portions 15 corresponding to the respective half cuts 14 are formed in the printing sheet 12. In the present example, the label portions 15 are the labels 15C each having a rectangular shape elongated in the lengthwise direction. The label markers 42 corresponding to the respective labels 15C are provided on the first surface 11A of the separation sheet 11. It is noted that the same reference numerals as used for the tape 10C are used to designate the corresponding elements of the tape 10D, and an explanation of which is dispensed with.

The remaining-amount markers 46 are provided on the tape 10D instead of the remaining-amount markers 45 (see FIG. 10). Each of the remaining-amount markers 46 is similar in configuration to each of the remaining-amount markers 44 (see FIG. 9) and is constituted by one white marker 46A and one black marker 46B. The length of each of the remaining-amount markers 46 in the widthwise direction is less than that of a corresponding one of the labels 15C in the widthwise direction. The length of each of the remaining-amount markers 46 in the lengthwise direction is less than that of the corresponding label 15C in the lengthwise direction. That is, the size of each of the remaining-amount markers 46 is less than that of the corresponding label 15C. Each of the remaining-amount markers 46 is disposed at a central portion of the corresponding label 15C in the lengthwise direction and the widthwise direction. Thus, the entire portion of each of the remaining-amount markers 46 overlaps the corresponding label 15C in the thickness direction.

The position of the remaining-amount markers 46 in the widthwise direction is different from the position of the label markers 42 in the widthwise direction. That is, the remaining-amount markers 46 and the label markers 42 are different from each other in position in the widthwise direction. Specifically, lower ends of the label markers 42 are separated from upper ends of the respective remaining-amount markers 46 in the up and down direction in FIG. 11. When the tape 10D is conveyed, the light L emitted from the optical sensor 56 (see FIG. 7) impinges on the label markers 42 but does not impinge on the remaining-amount markers 46.

In each of the remaining-amount markers 46, the white marker 46A and the black marker 46B are the same as each other in position in the widthwise direction. A portion of the white marker 46A and the black marker 46B are different from each other in position in the lengthwise direction. In the tape 10D, each of a plurality of the white markers 46A and each of a plurality of the black markers 46B are provided within a corresponding one of the labels 15C in the lengthwise direction. It is noted that an upstream end portion of the most-downstream white marker (i.e., the most-downstream label marker 42) on the tape roll 122 in the conveying direction is provided downstream, in the conveying direction, of a downstream end portion of the most-downstream black marker (i.e., the most-downstream black marker 46B) on the tape roll 122 in the conveying direction. In the unused tape cassette 100, as described above, the most-downstream label marker 42 in the conveying direction is exposed to the outside of the cassette casing 101 through the detection hole 150.

As in the case where the tape 10C (see FIG. 10) is used, the printer 1 performs image printing and label creation using the tape 10D. Based on label information about the label 15C, the printer 1 can create a label piece 205 having an appropriate length on which an image is formed at an appropriate position on the label 15C. The user can visually check the first surface 11A of the created label piece 205 to recognize the remaining number of the labels 15C based on the position of the black marker 46B relative to the white marker 46A.

There will be next described the tape 10E illustrated in FIG. 12 in detail. Similar to the tape 10A (see FIG. 8), the tape 10E is of the die-cut label type for creating the label piece having the fixed length. The label portions 15 corresponding to the respective half cuts 14 are formed in the printing sheet 12. The label markers 42, 43 corresponding to the respective label portions 15 are provided on the first surface 11A of the separation sheet 11. It is noted that the same reference numerals as used for the tape 10A are used to designate the corresponding elements of the tape 10E, and an explanation of which is dispensed with.

The label portions 15 include labels 15D and labels 15E. Each of the labels 15D and each of the labels 15E are different in shape from each other. Each of the labels 15D has a rectangular shape elongated in the lengthwise direction of the tape 10E. Each of the labels 15E has an oval shape elongated in the lengthwise direction of the tape 10E. In the present example, the labels 15D and the labels 15E are provided near the other end portion of the tape 10E in the widthwise direction (i.e., a lower end portion of the fourth surface 12B). The labels 15D and the labels 15E are alternately arranged in the lengthwise direction at predetermined intervals.

In the present example, the printing sheet 12 is constituted by a gray substrate like the separation sheet 11. Thus, the color of each of the third surface 12A and the fourth surface 12B is gray corresponding to the ground color of the printing sheet 12. The remaining-amount markers 47 are provided on the fourth surface 12B of the printing sheet 12. The remaining-amount markers 47 are provided corresponding to the respective labels 15D, 15E so as to be arranged in the lengthwise direction at predetermined intervals. Each of the remaining-amount markers 47 is similar in configuration to each of the remaining-amount markers 45 (see FIG. 11) and is constituted by one white marker 47A and one black marker 47B. A portion of the fourth surface 12B which is different from the remaining-amount markers 47 is a ground-color portion 48 having the ground color of the fourth surface 12B (i.e., gray).

The length of each of the remaining-amount markers 47 in the widthwise direction is less than that of a corresponding one of the labels 15D and the labels 15E in the widthwise direction. The length of each of the remaining-amount markers 47 in the lengthwise direction is less than the corresponding one of the labels 15D and the labels 15E in the lengthwise direction. That is, the size of each of the remaining-amount markers 47 is less than that of the corresponding one of the labels 15D and the labels 15E. Each of the remaining-amount markers 47 is disposed between (i) the corresponding one of the labels 15D and the labels 15E and (ii) one end portion of the tape 10E in the widthwise direction (i.e., an upper end portion of the fourth surface 12B). Thus, each of the remaining-amount markers 47 is located next to the corresponding one of the labels 15D and the labels 15E in the widthwise direction.

As on the tape 10A (see FIG. 8), the label markers 42, 43 are provided on the first surface 11A of the separation sheet 11. In the present example, the label markers 42 are provided corresponding to the respective labels 15D. The label markers 43 are provided corresponding to the respective labels 15E. When the tape 10E is conveyed, the light L emitted from the optical sensor 56 (see FIG. 7) impinges on the label markers 42, 43 but does not impinge on the remaining-amount markers 47 provided on the fourth surface 12B.

In each of the remaining-amount markers 47, the white marker 47A and the black marker 47B are the same as each other in position in the widthwise direction. A portion of the white marker 47A and the black marker 47B are different from each other in position in the lengthwise direction. In the tape 10E, each of a plurality of the white markers 47A and each of a plurality of the black markers 47B are provided within the corresponding one of the labels 15D and the labels 15E in the lengthwise direction. It is noted that the upstream end portion of the most-downstream white marker (i.e., the most-downstream label marker 42) on the tape roll 122 in the conveying direction is provided downstream, in the conveying direction, of a downstream end portion of the most-downstream black marker (i.e., the most-downstream black marker 47B) on the tape roll 122 in the conveying direction. In the present example, the most-downstream label marker 42 in the conveying direction is exposed to the outside of the cassette casing 101 through the detection hole 150 in the unused tape cassette 100 (e.g., at the point of sale) as described above.

As in the case where the tape 10A (see FIG. 8) is used, the printer 1 performs image printing and label creation using the tape 10E. Based on label information about the label 15D which is stored in the control circuit, not illustrated, the printer 1 can create a label piece 206 having an appropriate length on which an image is formed at an appropriate position on the label 15D. Based on label information about the label 15E which is stored in the control circuit, not illustrated, the printer 1 can create a label piece 207 having an appropriate length on which an image is formed at an appropriate position on the label 15E.

In the case where the label marker 42 is provided on the first surface 11A, the user need not visually check the fourth surface 12B to identify that the created label piece is the label piece 206 including the label 15D. In the case where the label marker 43 is provided on the first surface 11A, the user need not visually check the fourth surface 12B to identify that the created label piece is the label piece 207 including the label 15E. The user can visually check the fourth surface 12B of the created label pieces 206 or 207 to recognize the remaining number of the labels 15D, 15E based on the position of the black marker 47B relative to the white marker 47A.

As described above, the tape 10 according to the present embodiment (the tapes 10A-10E) has a strip shape extending in the lengthwise direction and the widthwise direction orthogonal to the lengthwise direction. The tape 10 has a subject surface (i.e., a gray one of the first surface 11A and the fourth surface 12B) located on the tape 10 and exposed in the thickness direction orthogonal to each of the lengthwise direction and the widthwise direction. A first marker (corresponding to the label markers 42 and the white markers 44A, 46A, 47A) is provided on the subject surface and is greater than the subject surface in reflectivity to the light with the particular wavelength. A second marker (corresponding to the label markers 43 and the black markers 44B, 45A, 46B, 47B) is provided on the subject surface and is less than the subject surface in the reflectivity. At least a portion of the first marker and at least a portion of the second marker are the same as each other in position in the widthwise direction. At least a portion of one of the first marker and the second marker and the other of the first marker and the second marker are different from each other in position in the lengthwise direction.

In the conventional technique, in the case where two markers different from each other in reflectivity are provided on the subject surface of the tape 10, for example, it is assumed that two markers (e.g., a gray marker and a black marker) different from each other in reflectivity and less than the subject surface in reflectivity are provided. In this case, the subject surface is required to be white or a color close to white in order to set a difference in brightness between the ground color of the subject surface and each marker, to a sufficiently large value. Thus, the substrate of the tape 10 is limited to a substrate that satisfies the requirement.

In the tape 10 according to the present embodiment, the first marker greater than the subject surface in reflectivity and the second marker less than the subject surface in reflectivity are provided. The reflectivity of the substrate of the tape 10 needs to be a value between the reflectivity of the first marker and the reflectivity of the second marker. Accordingly, when compared with the conventional tape, the tape 10 has improved flexibility of the substrate usable for forming the markers. On the tape 10, at least a portion of the first marker and at least a portion of the second marker are spaced apart from each other and arranged on the same straight line extending in the lengthwise direction. This configuration makes it easy for the user to visually check the first marker and the second marker and for the printer 1 to optically detect the first marker and the second marker.

The tape 10 (the tapes 10C-10E) has the separation sheet 11 (as one example of a first sheet) and the printing sheet 12 (as one example of a second sheet). The printing sheet 12 has the printing layer 18 and the adhesive layer 19 provided on the printing layer 18, and the printing sheet 12 is peelably stuck to the separation sheet 11 with the adhesive layer 19 interposed therebetween. The printing sheet 12 includes a plurality of die-cut labels (i.e., the labels 15C-15E) arranged in the lengthwise direction. The subject surface is provided on at least one of the separation sheet 11 and the printing sheet 12. A plurality of the markers (i.e., the white markers 46A or the white markers 47A, and the black markers 45A, the black markers 46B, or the black markers 47B) including at least ones of the first markers or the second markers are provided on the subject surface. At least a portion of each of the markers is provided, in the lengthwise direction, within an area on which a corresponding one of the die-cut labels is formed.

With this configuration, at least a portion of each of the markers and a corresponding one of the die-cut labels are arranged on the same straight line extending in the widthwise direction. This configuration makes it easy for the user to identify the marker by visually checking it with reference to the die-cut label. The printer 1 can detect the marker near the die-cut label.

The markers include the first markers (the white markers 46A or the white markers 47A) and the second markers (the black markers 46B or the black markers 47B). Each of the first markers is provided, in the lengthwise direction, within an area on which a corresponding one of the die-cut labels (the labels 15C-15E) is formed. Each of the second markers is provided, in the lengthwise direction, within an area on which a corresponding one of the die-cut labels (the labels 15C-15E) is formed.

With this configuration, each of the first markers and the second markers and a corresponding one of the die-cut labels are arranged on the same straight line extending in the widthwise direction. This configuration makes it easy for the user to identify the first marker and the second marker by visually checking them with reference to the die-cut label. The printer 1 can detect each of the first markers and the second markers near the corresponding die-cut label.

An upstream end portion of the most-downstream first marker (the most-downstream label marker 42) on the tape roll 122 in the conveying direction is provided downstream, in the conveying direction, of a downstream end portion of the most-downstream second marker (the most-downstream label markers 43 or the most-downstream black marker 45A, 46B, or 47B) on the tape roll 122 in the conveying direction. With this configuration, when the printer 1 starts printing, the optical sensor 56 detects the first marker before detecting the second marker. The printer 1 can perform calibration of the optical sensor 56 (e.g., setting of an upper limit value of light sensitivity) with reference to the first marker (i.e., the brightest marker) greater than the second marker in reflectivity.

The cassette casing 101 has the detection hole 150 through which a portion of the tape 10 contained in the cassette casing 101 is exposed to the outside of the cassette casing 101. At least a portion of the first marker (the label markers 42) is opposed to the detection hole 150 in the thickness direction. This configuration enables the printer 1 to detect the first marker through the detection hole 150. The user can visually check the first marker through the detection hole 150. In the case where the most-downstream first marker in the conveying direction is opposed to the detection hole 150 in the thickness direction in the unused tape cassette 100 (e.g., at the point of sale), when the tape cassette 100 is mounted on the printer 1, the optical sensor 56 is opposed to the first marker through the detection hole 150. With this configuration, before conveying the tape 10, the optical sensor 56 detects the brightest first marker, whereby the printer 1 can perform calibration of the optical sensor 56 before printing.

While the embodiment has been described above, it is to be understood that the disclosure is not limited to the details of the illustrated embodiment, but may be embodied with various changes and modifications, which may occur to those skilled in the art, without departing from the spirit and scope of the disclosure. The tape 10 is not limited to the tape for label creation and may be a tape constituted by a single-layer substrate without an adhesive layer (e.g., a single-layer tape for thermal printing). The printer 1 may use the sensor 29 (see FIG. 4) to detect the first markers and the second markers formed on the first surface 11A of the separation sheet 11. The printer 1 may include an optical sensor capable of optically detecting the first markers and the second markers formed on the fourth surface 12B of the printing sheet 12 (e.g., the remaining-amount markers 47 illustrated in FIG. 12). The printer 1 may include an optical sensor capable of optically detecting markers not detected by the optical sensor 56 (e.g., the remaining-amount markers 46 in FIG. 11 and the remaining-amount markers 47 in FIG. 12).

The first marker is not limited to the white marker. The first marker only needs to be greater than the subject surface in reflectivity to the light with the particular wavelength. Alternatively, the first marker may be formed with a metal leaf, such as a leaf of aluminum, stuck thereto to make the first marker greater than white in reflectivity to the light with the particular wavelength. The second marker is not limited to the black marker. The second marker only needs to be less than the subject surface in reflectivity to the light with the particular wavelength. The particular wavelength is not limited to the wavelength of the light L emitted from the optical sensor 56 and may be any of other wavelengths. A color (i.e., reflectivity) appropriate for the particular wavelength may be used for the color of each of the subject surface, the first marker, and the second marker. The first markers and the second markers may be changed in position, size, shape, the number, and so on without departing from the spirit and scope of the disclosure. For example, in the case where the tape 10 is of the die-cut label type, at least one of each first marker and each second marker may be provided on a portion of the second surface 11B of the separation sheet 11 which is opposed to the non-label portion 16 (i.e., a portion of the second surface 11B which is not opposed to the label portion 15).

Figure 13A:
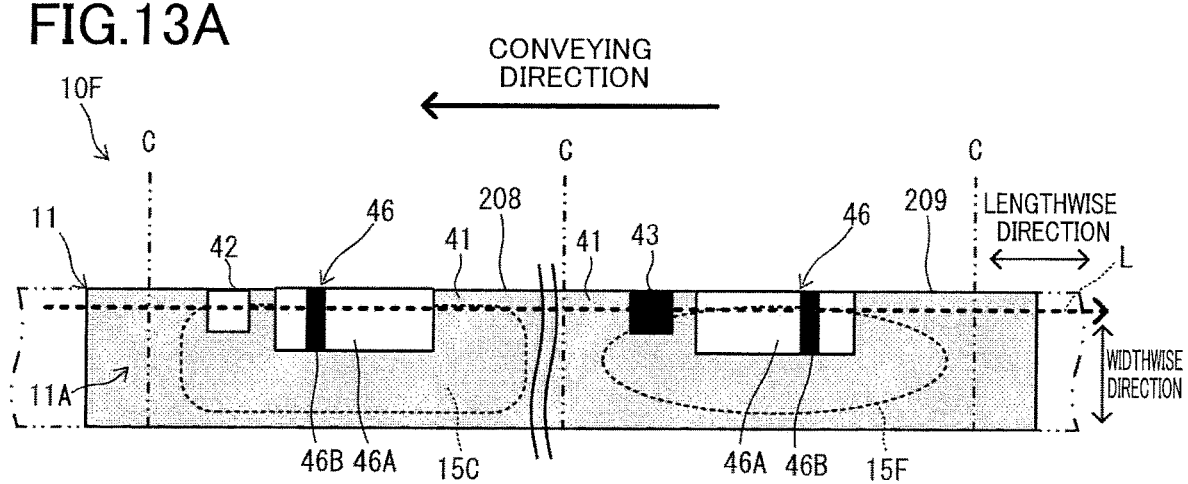
FIGS. 13A through 13C are views for explaining tapes 10F-10H, respectively.
Figure 13B:
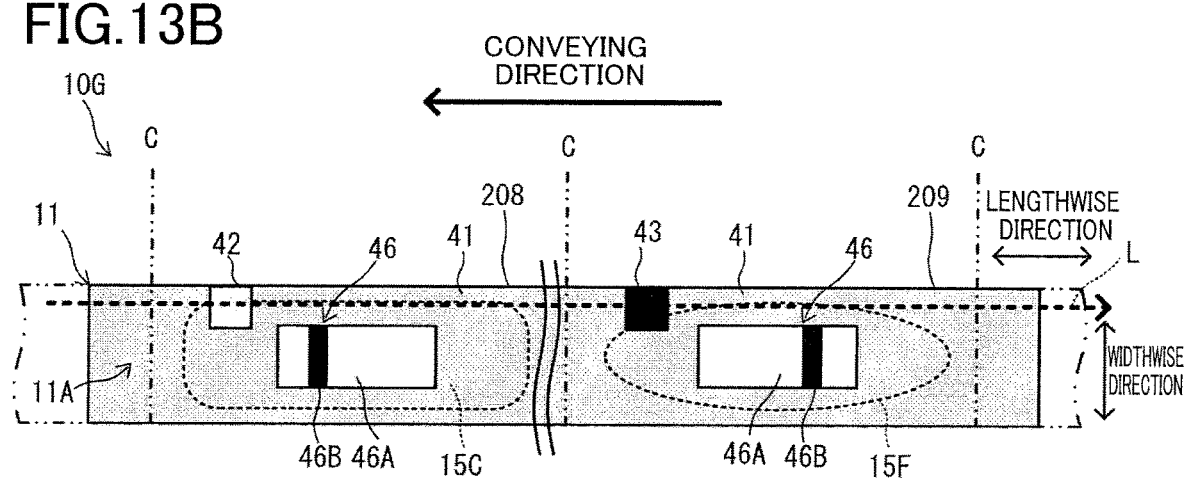
Figure 13C:
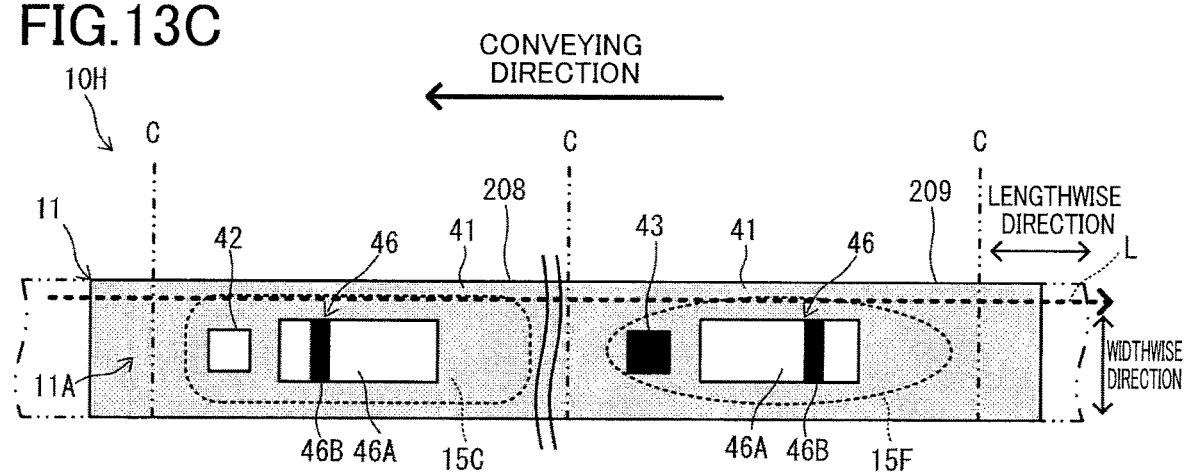

There will be next described tapes 10F-10H according to modifications of the tape 10 with reference to FIGS. 13A-13C. Like the tape 10D (see FIG. 11), each of the tapes 10F-10H is of the die-cut label type for creating the label piece having the fixed length. Each of the tapes 10F-10H is configured such that the label portions 15 corresponding to the respective half cuts 14 are formed in the printing sheet 12. It is noted that the same reference numerals as used for the tape 10D are used to designate the corresponding elements of the tapes 10F-10H, and an explanation of which is dispensed with.

There will be next described the tape 10F illustrated in FIG. 13A in detail. Each of the label portions 15 includes the label 15C and a label 15F different in shape from each other. Each of the labels 15F has an oval shape in the lengthwise direction of the tape 10F. The labels 15C and the labels 15F are provided on a central region of the tape 10F in the widthwise direction and alternately arranged in the lengthwise direction at predetermined intervals. The label markers 42, 43 are provided on an upper end portion of the first surface 11A of the separation sheet 11 so as to be arranged in the lengthwise direction. In the present example, the label markers 42 are provided corresponding to the respective labels 15C. The entire portion of each of the label markers 42 is located, in the lengthwise direction, between opposite end portions of a corresponding one of the labels 15C in the lengthwise direction. The label markers 43 are provided corresponding to the respective labels 15F. The entire portion of each of the label markers 43 is located, in the lengthwise direction, between opposite end portions of a corresponding one of the labels 15F in the lengthwise direction.

In the present example, the remaining-amount markers 46 are arranged in the lengthwise direction at the upper end portion of the first surface 11A. Each of the remaining-amount markers 46 is located upstream of a corresponding one of the label markers 42 and the label markers 43 in the conveying direction. Since the label markers 42, the label markers 43, and the remaining-amount markers 46 are different from each other in position in the lengthwise direction, these markers are not arranged in the widthwise direction. The entire portion of each of the remaining-amount markers 46 is located, in the lengthwise direction, between opposite end portions of a corresponding one of the labels 15C and the labels 15F in the lengthwise direction. When the tape 10F is conveyed, the light L emitted from the optical sensor 56 (see FIG. 7) impinges on the label markers 42, 43 and the remaining-amount markers 46.

As in the above-described embodiment, the printer 1 configured to perform printing using the tape 10F detects the label marker 42 and creates a label piece 208 based on label information about the label 15C. Also, the printer 1 detects the label marker 43 and creates a label piece 209 based on label information about the label 15F. The printer 1 can identify the remaining number of the labels 15C, 15F based on a result of detection of the remaining-amount marker 46. The user can recognize whether the created label piece is the label piece 208 or 209, based on any of the label markers 42, 43 located on the first surface 11A of the label piece. The user can visually check the remaining-amount marker 46 to recognize the remaining number of the labels 15C, 15F.

There will be next described the tape 10G illustrated in FIG. 13B in detail. The tape 10G is different from the tape 10F (see FIG. 13A) only in that the entire portion of each of the remaining-amount markers 46 overlaps a corresponding one of the labels 15C, 15F in the thickness direction. It is noted that, since the label markers 42, the label markers 43, and the remaining-amount markers 46 are different from each other in position in the lengthwise direction, these markers are not arranged in the widthwise direction. When the tape 10G is conveyed, the light L emitted from the optical sensor 56 (see FIG. 7) impinges on the label markers 42, 43. As in the above-described modification, the printer 1 configured to perform printing using the tape 10G can create the label pieces 208, 209. This configuration enables the user to recognize whether the created label piece is the label piece 208 or 209 and to recognize the remaining number of the labels 15C, 15F.

There will be next described the tape 10H illustrated in FIG. 13C in detail. The tape 10H is different from the tape 10G (see FIG. 13B) in that the entire portion of each of the remaining-amount markers 46 overlaps a corresponding one of the labels 15C, 15F in the thickness direction and that the entire portion of each of the label markers 42, 43 overlaps a corresponding one of the labels 15C, 15F in the thickness direction. Since the label markers 42, the label markers 43, and the remaining-amount markers 46 are different from each other in position in the lengthwise direction, these markers are not arranged in the widthwise direction. In the present example, when the tape 10H is conveyed, the light L emitted from the optical sensor 56 (see FIG. 7) does not impinge on any of the label markers 42, the label markers 43, and the remaining-amount markers 46. This configuration, as in the above-described modification, enables the user to recognize whether the created label piece is the label piece 208 or 209 and to recognize the remaining number of the labels 15C, 15F.

In the tape 10 according to each of the present modifications (the tapes 10G-10H), the printing sheet 12 includes the die-cut labels (the labels 15C, 15F) arranged in the lengthwise direction. The first markers (the label markers 42 and the white marker 46A) and the second markers (the label markers 43 and the black markers 46B) are provided on the subject surface (the first surface 11A). Each of the first markers includes a first separation marker (the label marker 42) and a first stacked marker (the white marker 46A). The first separation marker is one of the first markers, and the entire first separation marker is separated from the second markers. The first stacked marker is another of the first markers, and at least a portion of the first stacked marker overlaps at least a portion of the second markers in the thickness direction.

Each of the second markers includes a second separation marker (the label markers 43) and a second stacked marker (the black marker 46B). The second separation marker is one of the second markers, and the entire second separation marker is separated from the first markers. The second stacked marker is another of the second markers, and at least a portion of the second stacked marker overlaps at least a portion of the first markers in the thickness direction. At least a portion of each of the first separation marker, the first stacked marker, the second separation marker, and the second stacked marker is provided, in the lengthwise direction, within an area on which a corresponding one of the die-cut labels (i.e., the label 15C or the label 15F) is formed.

With this configuration, each of the first separation marker, the second separation marker, the first stacked marker, and the second stacked marker, and a corresponding one of the die-cut labels are arranged on the same straight line extending in the widthwise direction. This configuration makes it easy for the user to identify the first separation marker, the second separation marker, the first stacked marker, and the second stacked marker by visually checking them with reference to the die-cut label. The printer 1 can detect each of the first separation markers, the second separation markers, the first stacked markers, and the second stacked markers near the corresponding die-cut label.

What is claimed is:

1. A tape having a strip shape extending in a lengthwise direction and a widthwise direction orthogonal to the lengthwise direction, the tape comprising:
    a first sheet;
    a second sheet peelably stuck to the first sheet, with a printing layer and an adhesive layer interposed between the first sheet and the second sheet,
    a subject surface located on at least one of the first sheet and the second sheet of the tape and exposed in a thickness direction orthogonal to each of the lengthwise direction and the widthwise direction;
    a first marker provided on the subject surface and being greater than the subject surface in reflectivity to light with a particular wavelength; and
    a second marker provided on the subject surface and being less than the subject surface in the reflectivity,
    wherein at least a portion of the first marker and at least a portion of the second marker are identical to each other in position in the widthwise direction, wherein at least a portion of one of the first marker and the second marker and at least a portion of another of the first marker and the second marker are different from each other in position in the lengthwise direction, wherein the second sheet comprises a plurality of die-cut labels arranged in the lengthwise direction, and the plurality of die-cut labels comprise a first shaped die-cut label and a second shaped die-cut label, the second shaped die-cut label different in shape from the first shaped die-cut label, and wherein the first marker is located, in the lengthwise direction, within an area on which the first shaped die-cut label is formed, and the second marker is located, in the lengthwise direction, within an area on which the second shaped die-cut label is formed.

2. The tape according to claim 1, wherein a plurality of markers at least comprising: a plurality of first markers each as the first marker; or a plurality of second markers each as the second marker are provided on the subject surface, and wherein at least a portion of each of the plurality of markers is located, in the lengthwise direction, within an area on which a corresponding one of the plurality of die-cut labels is formed.

3. The tape according to claim 2, wherein the plurality of markers comprise the plurality of first markers and the plurality of second markers, wherein the plurality of die-cut labels comprise: a plurality of first die-cut labels, each as the first shaped die-cut label, corresponding to the plurality of first markers; and a plurality of second die-cut labels, each as the second shaped die-cut label, corresponding to the plurality of second markers, wherein each of the plurality of first markers is located, in the lengthwise direction, within an area on which a corresponding one of the plurality of first die-cut labels is formed, and wherein each of the plurality of second markers is located, in the lengthwise direction, within an area on which a corresponding one of the plurality of second die-cut labels is formed.

4. The tape according to claim 1, wherein one of the first marker and the second marker is formed directly on the subject surface, and wherein at least a portion of another of the first marker and the second marker is located on an opposite side of at least a portion of the one of the first marker and the second marker from the subject surface in the thickness direction.

5. The tape according to claim 1, wherein the second sheet comprises the plurality of die-cut labels arranged along the lengthwise direction, wherein a plurality of first markers each as the first marker and a plurality of second markers each as the second marker are provided on the subject surface, wherein the plurality of first markers comprise:
a first separation marker that is one of the plurality of first markers, an entirety of the first separation marker being spaced apart from the plurality of second markers; and
a first stacked marker that is one of the plurality of first markers and that is different from the first separation marker, at least a portion of the first stacked marker being stacked on at least a portion of the plurality of second markers in the thickness direction, wherein the plurality of second markers comprise:
a second separation marker that is one of the plurality of second markers, an entirety of the second separation marker being spaced apart from the plurality of first markers; and
a second stacked marker that is one of the plurality of second markers and that is different from the second separation marker, at least a portion of the second stacked marker being stacked on at least a portion of the plurality of first markers in the thickness direction, and wherein at least a portion of each of the first separation marker, the first stacked marker, the second separation marker, and the second stacked marker is located, in the lengthwise direction, within an area on which a corresponding one of the plurality of die-cut labels is formed.

6. The tape according to claim 1, wherein the first marker is greater than white in the reflectivity.

7. The tape according to claim 1, wherein the first marker is formed of ink containing a white pigment.

8. A tape cassette, comprising:

a tape roll that is a roll of a tape having a strip shape extending in a lengthwise direction and a widthwise direction orthogonal to the lengthwise direction, the tape comprising: (i) a first sheet: (ii) a second sheet peelably stuck to the first sheet, with a printing layer and an adhesive layer interposed between the first sheet and the second sheet; (iii) a subject surface located on at least one of the first sheet and the second sheet of the tape and exposed in a thickness direction orthogonal to each of the lengthwise direction and the widthwise direction; (iv) a first marker provided on the subject surface and being greater than the subject surface in reflectivity to light with a particular wavelength; and (v) a second marker provided on the subject surface and being less than the subject surface in the reflectivity, wherein at least a portion of the first marker and at least a portion of the second marker are identical to each other in position in the widthwise direction, wherein at least a portion of one of the first marker and the second marker and at least a portion of another of the first marker and the second marker are different from each other in position in the lengthwise direction, wherein the second sheet comprises a plurality of die-cut labels arranged in the lengthwise direction, and the plurality of die-cut labels comprise a first shaped die-cut label and a second shaped die-cut label, the second shaped die-cut label different in shape from the first shaped die-cut label, and wherein the first marker is located, in the lengthwise direction, within an area on which the first shaped die-cut label is formed, and the second marker is located in the lengthwise direction, within an area on which the second shaped die-cut label is formed; and a cassette casing which accommodates the tape roll and in which the tape drawn from the tape roll is conveyed along a particular direction, wherein the first marker nearest to a downstream end portion of the tape roll in the particular direction is provided downstream, in the particular direction, of the second marker nearest to the downstream end portion of the tape roll in the particular direction.

9. The tape cassette according to claim 8, wherein the cassette casing comprises an opening through which a portion of the tape located in the cassette casing is exposed to an outside of the cassette casing, and wherein at least a portion of the first marker is opposed to the opening in the thickness direction.

* * * * *